United States Patent
Peeters et al.

(10) Patent No.: US 10,021,370 B2
(45) Date of Patent: Jul. 10, 2018

(54) INSPECTION DEVICE CONTROLLED PROCESSING LINE SYSTEM

(71) Applicant: Qcify Inc., San Mateo, CA (US)

(72) Inventors: Raf Peeters, San Mateo, CA (US); Bert Peelaers, Herentals (BE)

(73) Assignee: Qcify Inc., San Mateo, CA (US)

( * ) Notice: Subject to any disclaimer, the term of this patent is extended or adjusted under 35 U.S.C. 154(b) by 0 days.

(21) Appl. No.: 15/817,240

(22) Filed: Nov. 19, 2017

(65) Prior Publication Data

US 2018/0077402 A1    Mar. 15, 2018

Related U.S. Application Data

(63) Continuation-in-part of application No. 15/219,870, filed on Jul. 26, 2016.

(51) Int. Cl.
*H04N 5/77* (2006.01)
*H04N 13/02* (2006.01)
*G06T 7/00* (2017.01)

(52) U.S. Cl.
CPC ....... *H04N 13/0242* (2013.01); *G06T 7/0008* (2013.01); *H04N 13/0253* (2013.01); *G06T 2207/10021* (2013.01); *G06T 2207/30128* (2013.01)

(58) Field of Classification Search
None
See application file for complete search history.

(56) References Cited

U.S. PATENT DOCUMENTS

| | | | |
|---|---|---|---|
| 2014/0091215 A1* | 4/2014 | Watanabe | H01J 37/265 250/307 |
| 2015/0033310 A1* | 1/2015 | Chen | H04L 9/3231 726/7 |
| 2015/0097713 A1* | 4/2015 | Nakai | G01S 13/04 342/27 |
| 2015/0362897 A1* | 12/2015 | Chapman | E21B 44/00 700/9 |
| 2017/0054950 A1* | 2/2017 | Yeo | H04N 7/188 |
| 2017/0102288 A1* | 4/2017 | Schell | G01M 11/31 |

* cited by examiner

*Primary Examiner* — Eileen M Adams
(74) *Attorney, Agent, or Firm* — Imperium Patent Works LLP; Mark D. Marrello

(57) ABSTRACT

An optical inspector with feedback capability includes an optical device that captures an image when a sample is within the field of view of the optical device, a storage device that stores the captured image, a processor that determines a quality characteristic value of the sample based on the captured image, and an interface circuit that outputs inspection data or a command based on the quality characteristic value. A method of controlling a sample processing line is also disclosed, the method including capturing an image of a sample traversing the processing line, determining a quality characteristic of the sample based at least in part on the captured image, and causing the operation of a device included in the processing line to be adjusted based at least in part on the quality characteristic value. In one example, the optical inspector is an in-flight 3D inspector located in the processing line.

17 Claims, 23 Drawing Sheets

IN-FLIGHT 3D INSPECTOR FRONT PERSPECTIVE VIEW

IN-FLIGHT 3D INSPECTOR FRONT PERSPECTIVE VIEW

IN-FLIGHT 3D INSPECTOR REAR PERSPECTIVE VIEW

IN-FLIGHT 3D INSPECTOR RIGHT SIDE VIEW

IN-FLIGHT 3D INSPECTOR LEFT SIDE VIEW

SAMPLE TRAVEL PATH THROUGH IN-FLIGHT 3D INSPECTOR

IMAGE OF SAMPLE CAPTURED BY THE FIRST CAMERA

IMAGE OF SAMPLE CAPTURED BY THE SECOND CAMERA

IMAGE OF SAMPLE CAPTURED BY THE THIRD CAMERA

IMAGE OF SAMPLE CAPTURED BY THE FOURTH CAMERA

INSPECTION DEVICE

INSPECTION DATA COMMUNICATION SYSTEM

COMMAND COMMUNICATION SYSTEM

| SAMPLE | QUALITY CHARACTERISTIC | REQUIREMENT | PASS/FAIL? |
|---|---|---|---|
| 1 | NUMBER OF PITS | < 3 | PASS |
| 2 | NUMBER OF PITS | < 3 | PASS |
| 3 | NUMBER OF PITS | < 3 | FAIL |
| 4 | NUMBER OF PITS | < 3 | PASS |
| 5 | NUMBER OF PITS | < 3 | PASS |
| 6 | NUMBER OF PITS | < 3 | FAIL |
| 7 | NUMBER OF PITS | < 3 | PASS |
| 8 | NUMBER OF PITS | < 3 | PASS |
| 9 | NUMBER OF PITS | < 3 | FAIL |
| 10 | NUMBER OF PITS | < 3 | PASS |

*PASS PERCENTAGE = 70%*   *FAIL PERCENTAGE = 30%*
*NUMBER OF PASSING SAMPLES = 7*   *NUMBER OF FAILING SAMPLES = 3*

INSPECTION DATA

FIG. 18

| SAMPLE | QUALITY CHARACTERISTIC | REQUIREMENT | PASS/FAIL? |
|---|---|---|---|
| 1 | TYPE OF OBJECT | ALMOND | FAIL |
| 2 | TYPE OF OBJECT | ALMOND | PASS |
| 3 | TYPE OF OBJECT | ALMOND | FAIL |
| 4 | TYPE OF OBJECT | ALMOND | PASS |
| 5 | TYPE OF OBJECT | ALMOND | PASS |
| 6 | TYPE OF OBJECT | ALMOND | FAIL |
| 7 | TYPE OF OBJECT | ALMOND | PASS |
| 8 | TYPE OF OBJECT | ALMOND | PASS |
| 9 | TYPE OF OBJECT | ALMOND | FAIL |
| 10 | TYPE OF OBJECT | ALMOND | PASS |

*PASS PERCENTAGE = 60%*   *FAIL PERCENTAGE = 40%*
*NUMBER OF PASSING SAMPLES = 6*   *NUMBER OF FAILING SAMPLES = 4*

INSPECTION DATA

FIG. 19

| SAMPLE | QUALITY CHARACTERISTIC | REQUIREMENT | PASS/FAIL? |
|---|---|---|---|
| 1 | NUMBER OF HOLES | < 1 | PASS |
| 2 | NUMBER OF HOLES | < 1 | PASS |
| 3 | NUMBER OF HOLES | < 1 | FAIL |
| 4 | NUMBER OF HOLES | < 1 | PASS |
| 5 | NUMBER OF HOLES | < 1 | PASS |
| 6 | NUMBER OF HOLES | < 1 | FAIL |
| 7 | NUMBER OF HOLES | < 1 | PASS |
| 8 | NUMBER OF HOLES | < 1 | PASS |
| 9 | NUMBER OF HOLES | < 1 | FAIL |
| 10 | NUMBER OF HOLES | < 1 | PASS |

*PASS PERCENTAGE = 70%*  *FAIL PERCENTAGE = 30%*
*NUMBER OF PASSING SAMPLES = 7*  *NUMBER OF FAILING SAMPLES = 3*

INSPECTION DATA

FIG. 20

COMMAND BASED ON INSPECTION DATA

COMMAND BASED ON INSPECTION DATA

COMMAND BASED ON INSPECTION DATA

INSPECTION DATA COMMUNICATION SYSTEM FLOWCHART

INSPECTION DATA CONTROL SYSTEM
USING A REMOTE COMPUTING DEVICE FLOWCHART

INSPECTION DEVICE CONTROLLED PROCESSING LINE SYSTEM

CROSS REFERENCE TO RELATED APPLICATIONS

This application is a continuation-in-part of, and claims priority under 35 U.S.C. § 120 from nonprovisional U.S. patent application Ser. No. 15/219,870, entitled "IN-FLIGHT 3D INSPECTOR," filed on Jul. 26, 2016, the subject matter of which is incorporated herein by reference.

TECHNICAL FIELD

The described embodiments relate generally to capturing multiple images of an object at a single moment while the object is in-flight, and more particularly to use the captured images to generate a three-dimensional image of the sample to aid in the detection of sample defects.

BACKGROUND INFORMATION

Detection of defects present on various objects such as tree nuts and tablets is currently performed by human inspection. A human inspector visually scans multiple objects and looks for defects in each of the objects viewed. The human inspector then generates a report as to the quality of the objects viewed. The quality report is used to grade the quality of the objects and determine the price of the objects. Human inspection takes a great amount of time and cost. Human inspection also results in inconsistent quality reports between different human inspectors. A faster, less expensive and more repeatable inspection solution is needed.

SUMMARY

In a first novel aspect, an in-flight 3D inspector includes a first camera and a second camera, a trigger, a light source, a storage device, a sample input funnel, a sample chute, a collector bin, and a computer system. The sample chute receives a sample from the sample input funnel and directs the sample toward a focal plane. The trigger detects the presence of a sample and generates a trigger signal. The first and second cameras are each focused on the focal plane and are adapted to capture an image in response to receiving a trigger signal. The light source is adapted to illuminate the sample when it travels through the focal plane. The in-flight 3D inspector is configured such that the sample is not in contact with any surface while traveling through the focal plane. A storage device adapted to store images captured by the first and second cameras. The collector bin is adapted to receive the sample after the sample travels through the focal plane. The computer system adapted to generate a three dimensional image of the sample based on the images captured by the first and second cameras.

In a second novel aspect, in a first step a sample is propelled toward a focal plane. In a second step, it is determined when the sample will travel through the focal plane. In a third step, the sample is illuminated as it travels through the focal plane. In a fourth step, two or more images of the sample are captured while the sample is traveling through the focal plane. Each image is captured from a different angle, and the sample is not in contact with any surface as the sample travels through the focal plane. In a fifth step, the two or more images are stored in a storage device. In a sixth step, a three dimensional image of the sample based on the two or more captured images is generated. In a seventh step, one or more characteristics of the sample are determined based on the three dimensional image.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 18 is a diagram of a first example of inspection data.

FIG. 19 is a diagram of a second example of inspection data.

FIG. 20 is a diagram of a third example of inspection data.

DETAILED DESCRIPTION

Reference will now be made in detail to background examples and some embodiments of the invention, examples of which are illustrated in the accompanying drawings. In the description and claims below, relational terms such as "top", "down", "upper", "lower", "top", "bottom", "left" and "right" may be used to describe relative orientations between different parts of a structure being described, and it is to be understood that the overall structure being described can actually be oriented in any way in three-dimensional space.

Due to the drawbacks of human visual inspection, an automated inspector is needed to quickly, inexpensively and accurately detect defects present in objects such as tree nuts, tablets, screws and many other types of objects. Some of the most important features of such an automatic inspector include: cost, number of objects inspected per minute, accuracy of defect detection, reliability of defect detection and ease of use with minimal user training.

Figure 1:
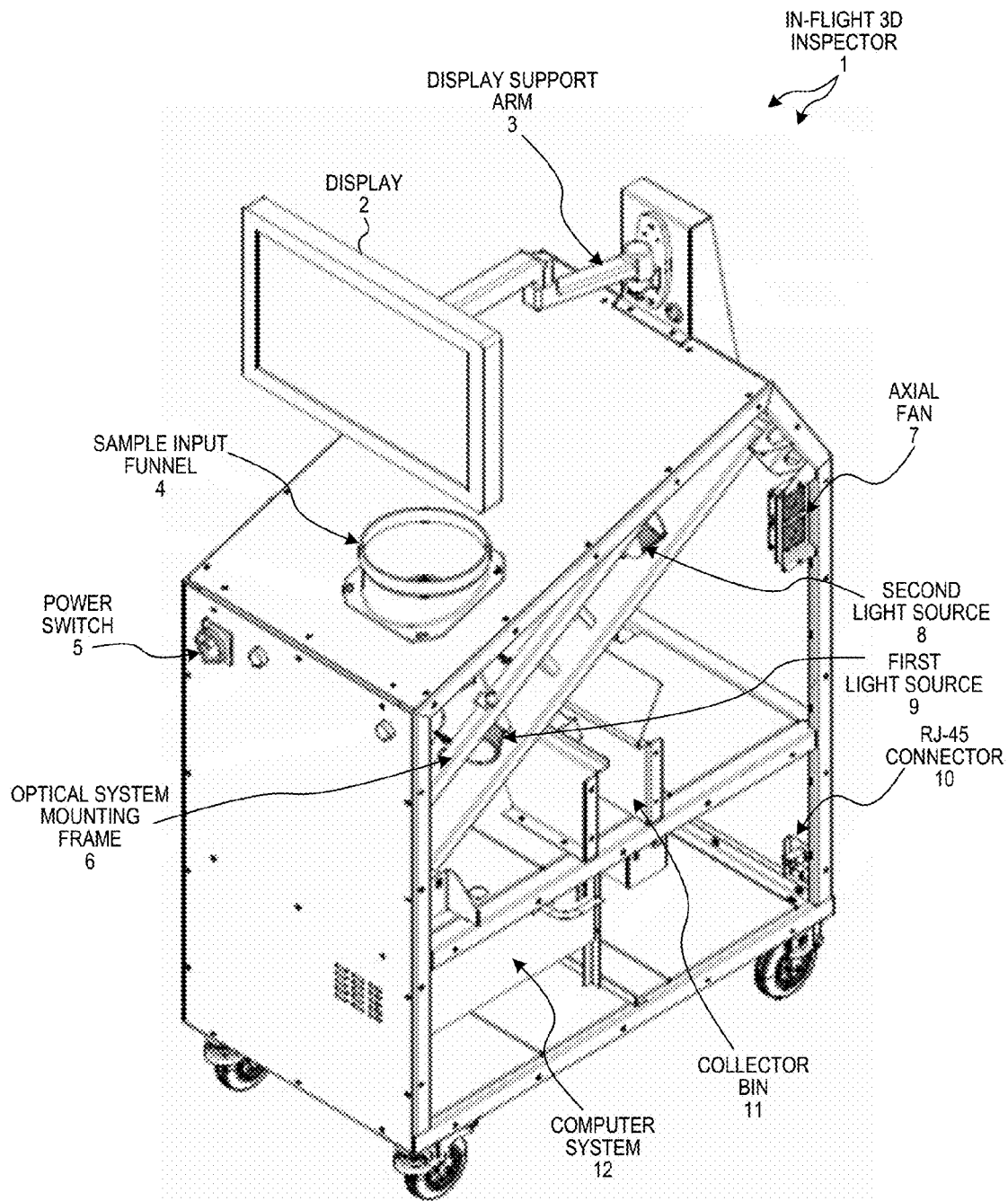
FIG. 1 is a first diagram of the in-flight 3D inspector 1 view from a first perspective.

FIG. 1 is a first diagram of the in-flight 3D inspector 1 view from a first perspective. The in-flight 3D inspector 1 includes a display 2, a display support arm 3, a sample input funnel 4, a power switch 5, an optical system mounting frame 6, an axial fan 7, a first light source 9, a second light source 8, an RJ-45 connector 10, a collector bin 11, and a computer system 12. The display 2 outputs information from the computer system 12 to a human user looking at the display. The display support arm 3 attaches the display 2 to the in-flight 3D inspector 1. In one example, the display support arm is adjustable with two hinges as shown in FIG. 1. In another example, the display support arm 3 is adjustable in additional dimensions (not shown in FIG. 1). The sample input funnel 4 is where samples are input to the in-flight 3D inspector. Power switch 5 is used by a human user to turn on (or off) the in-flight 3D inspector. The light sources are mounted to the optical system mounting frame 6. The axial fan 7 is used to create positive pressure in a camera enclosure (not shown in FIG. 1). In one example, the axial fan 7 is coupled to a first hose that directs air flow to a first camera enclosure and is coupled to a second hose that directs air flow to a second camera enclosure (not shown). The hoses can be fixed or flexible hoses made of various materials including various plastics, fiberglass and metal materials. In this fashion, positive pressure in each camera enclosure is created. The positive pressure prevents debris from entering the camera enclosures and settling on any of the cameras. RJ-45 connector 10 is configured to receive an RJ-45 cable connected to a local network and electrically connect the RJ-45 cable to a network input port included on the computer system 12. The RJ-45 cable may be an ethernet cable (not shown). Via the RJ-45 connector 10 and a RJ-45 ethernet cable, the computer system 12 can connect to a local network or the public Internet. The computer system 12 may also include a wireless networking card (not shown) that allows computer system 12 to wirelessly communicate (i.e. WiFi or cellular connection) with a network without the need for a wired connection. The collector bin 11 is configured to collect samples that have completed their path through the in-flight 3D inspector.

Figure 2:
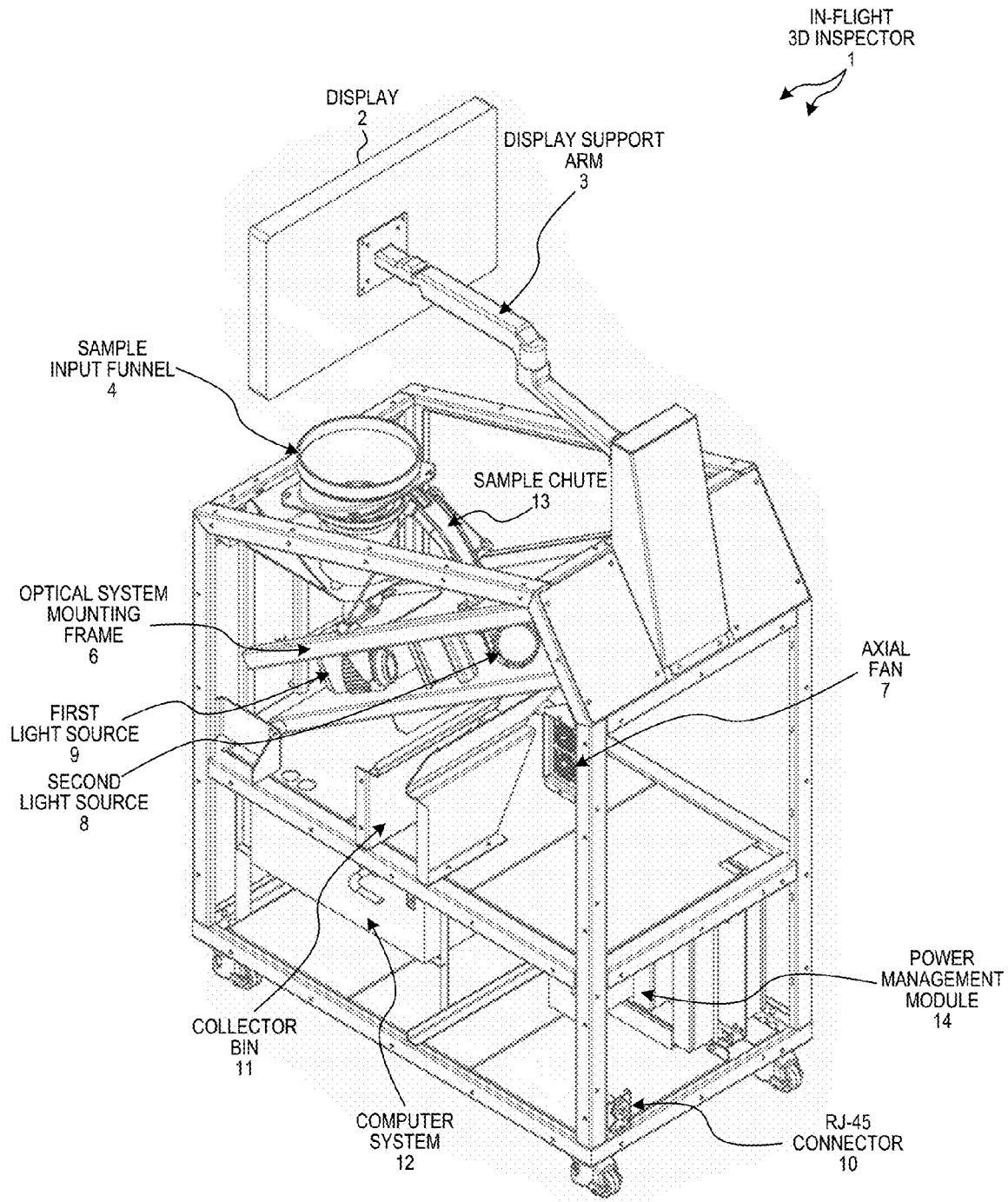
FIG. 2 is a second diagram of the in-flight 3D inspector 1 view from a second perspective.
Figure 14:
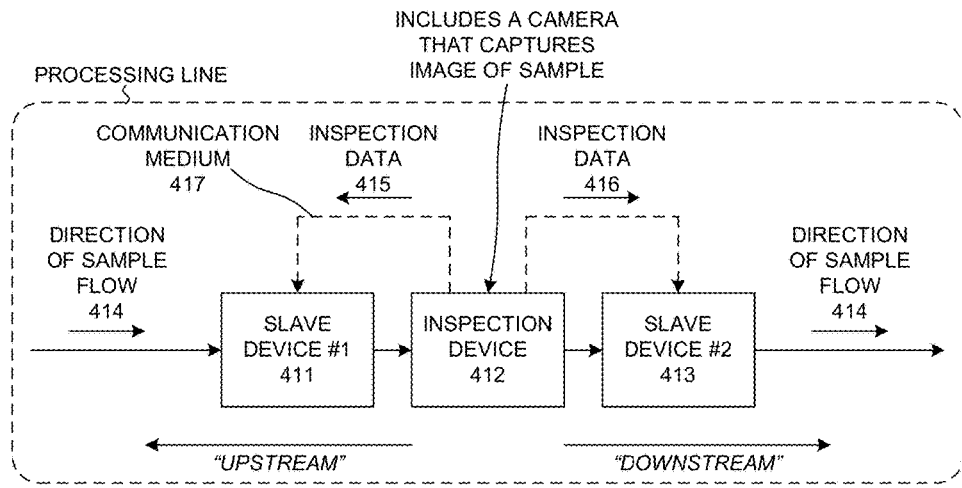
FIG. 14 is a diagram of an inspection data communication system.

FIG. 2 is a second diagram of the in-flight 3D inspector 1 view from a second perspective. FIG. 2 illustrates a sample chute 13 that is configured to guide a sample from the sample input funnel 4. The location of a power management module 14 is also shown in FIG. 14. The power management module 14 receives input power from the local power grid and generates power signals for the various electrical components operating within the in-flight 3D inspector 1. For example, the power management module 14 generates a power signal that is used to power the various light sources, the various cameras (not shown), the axial fan, the display and the computer system. In one example, the power management module 14 includes a battery which can be used to operate the in-flight 3D inspector when power from the local power grid is lost.

Figure 3:
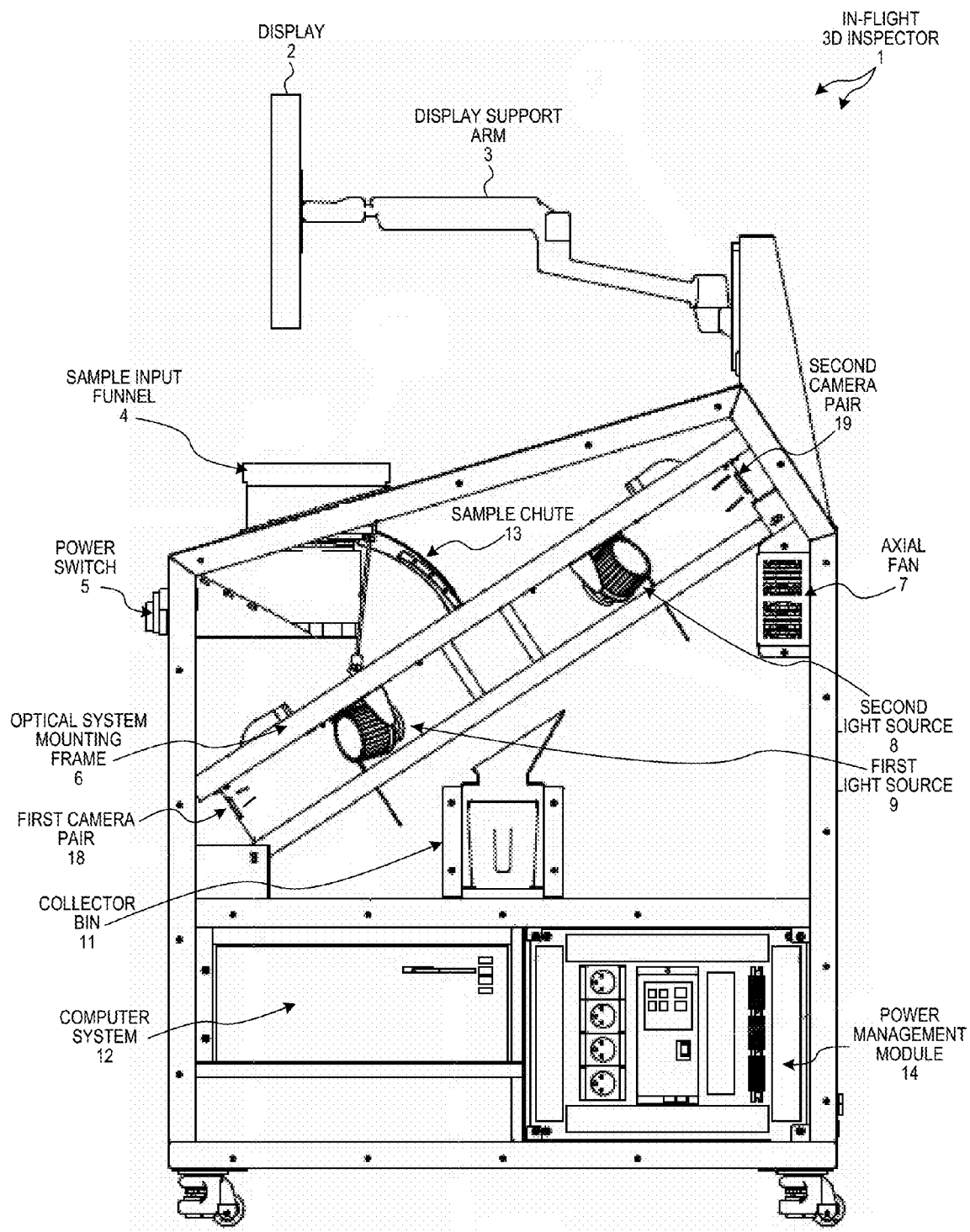
FIG. 3 is a third diagram of the in-flight 3D inspector 1 view from a right side view.
Figure 6:
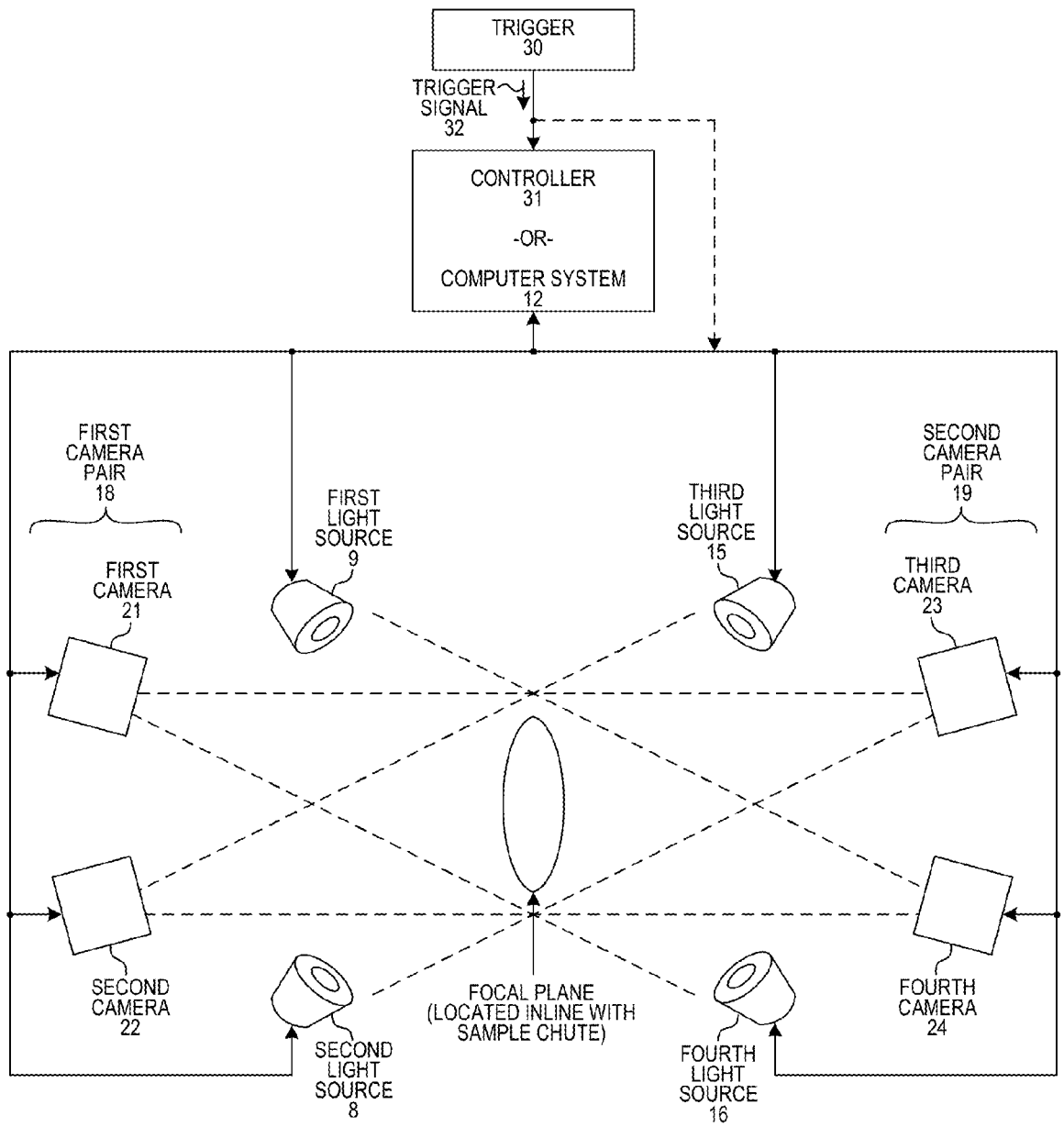
FIG. 6 is a diagram of a double stereo camera system configuration with triggering.

FIG. 3 is a third diagram of the in-flight 3D inspector 1 view from a right side view. FIG. 3 shows a first camera pair 18 and a second camera pair 19. FIG. 3 also illustrates that sample chute 13 is aligned with the midpoint between the first camera pair 18 and the second camera pair 19. The physical arrangement of the first camera pair 18 and the second camera pair 19 is illustrated in FIG. 6. FIG. 6 illustrates that the first camera pair 18 includes a first camera 21 and a second camera 22. The second camera pair 19 includes a third camera 23 and a fourth camera 24. All four cameras are focused on the same focal plane. The focal plane is located at the midpoint between the first camera pair 18 and the second camera pair 19. As discussed above regarding FIG. 3, the chute is also aligned with the midpoint between the first camera pair 18 and the second camera pair 19.

Camera Positioning

The four cameras are positioned such that each camera is focused on the focal plane. Each camera utilizes a lens to focus on the focal plane. In one example, wide angle lenses are used by each camera. One example of a wide angle lens is FL-BC1618-9M Ricoh lens. This wide angle lens has a format size of 1" format, a focal length of sixteen millimeters, a maximum aperture ratio of 1:1.8, an iris range of 1.8 to 16, and a resolution of nine mega-pixels. Other types of lenses may be used to achieve the necessary focus of each camera on the focal plane.

Figure 4:
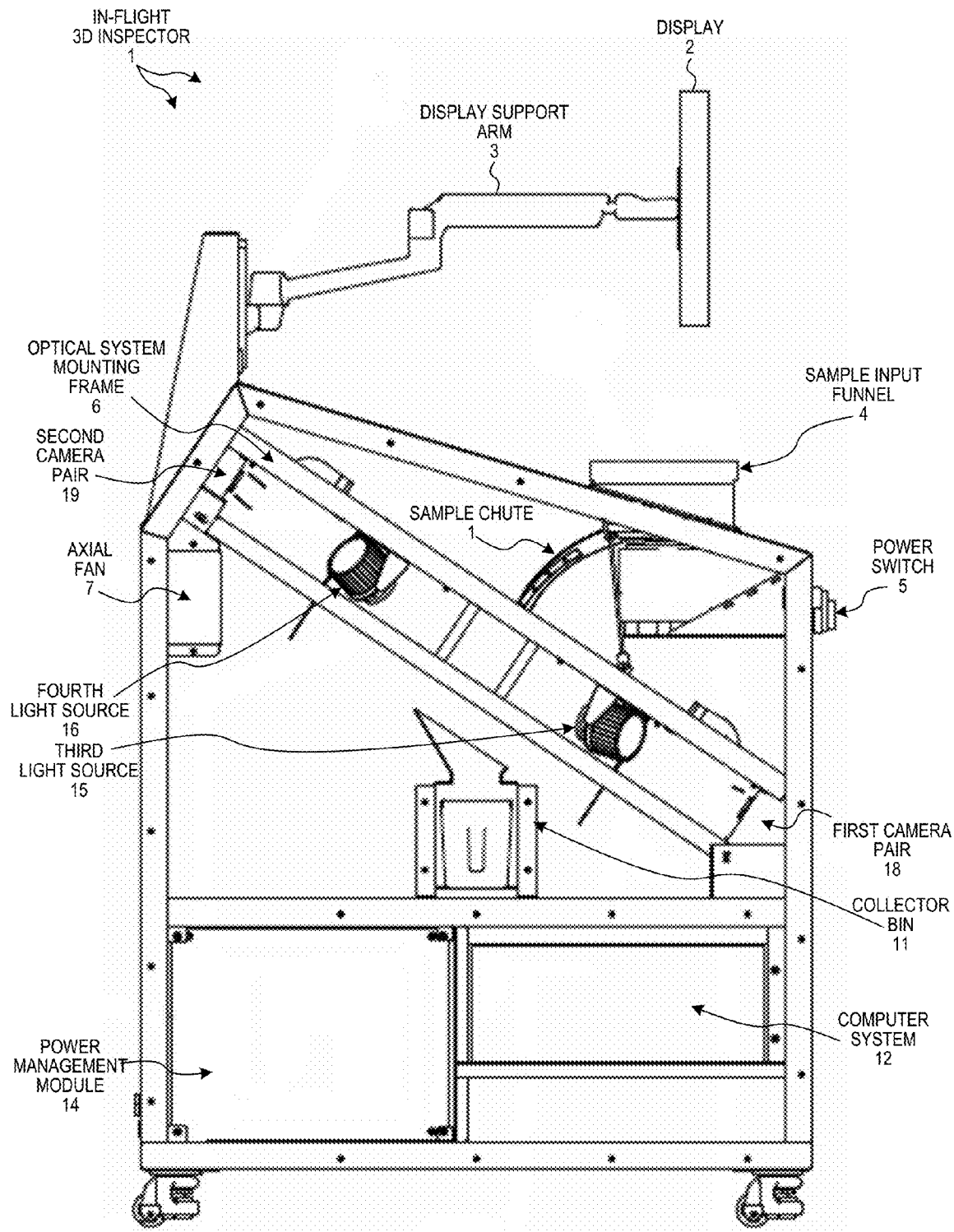
FIG. 4 is a fourth diagram of the in-flight 3D inspector 1 view from a left side view.

FIG. 4 is a fourth diagram of the in-flight 3D inspector 1 view from a left side view. FIG. 4 illustrates that a third light source 15 and a fourth light source 16 are also included in the in-flight 3D inspector 1. In one example, the first, second, third and fourth light sources are mounted to the optical system mounting frame 6. In another example, the light sources are mounted directly to outer frame of the in-flight 3D inspector 1 (not shown). After reading of the present disclosure, one skilled in the art will readily appreciate the various ways that light sources and cameras can be physically mounted within the in-flight 3D inspector 1.

Figure 5:
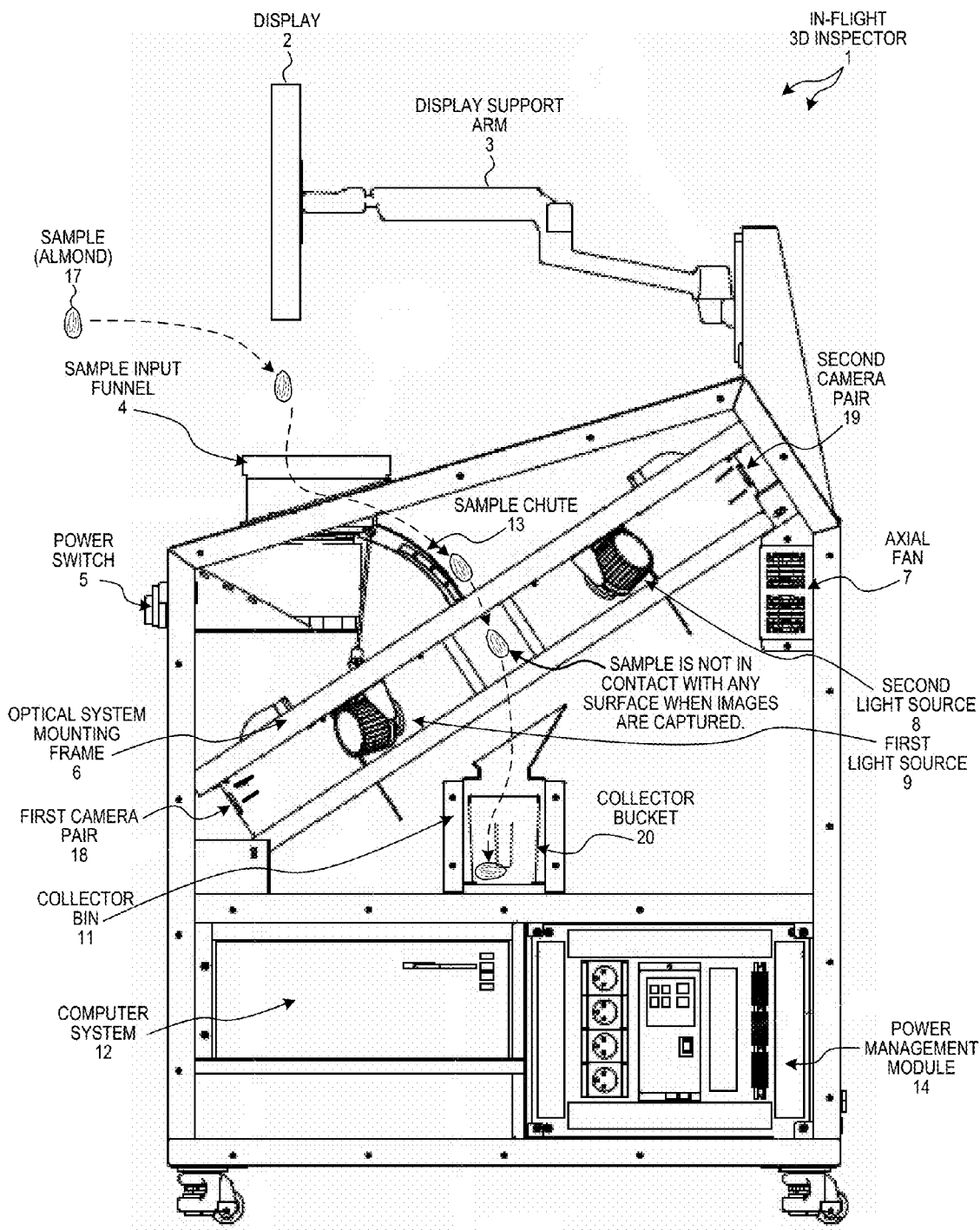
FIG. 5 is a diagram of the in-flight 3D inspector 1 illustrating the path a sample travels through the in-flight 3D inspector 1.

FIG. 5 is a diagram of the in-flight 3D inspector 1 illustrating the path a sample travels through the in-flight 3D inspector 1. First, a sample 17 is placed into the sample input funnel 4. The sample input funnel 4 directs the sample 17 to sample chute 13. In one example, the sample input funnel 4 is configured to vibrate such that sample 17 is directed toward sample chute 13. Sample chute 13 directs the sample 17 to a focal plane where the first camera pair 18 and the second camera pair 19 are both focused. In-flight 3D inspector 1 may be used to generate images of various types of samples, such as tree nuts, a peanuts, tablets, screws and washers.

Triggering System

Before the sample 17 reaches the focal plane, a trigger senses the presence of the sample 17 near the sample chute 13 and generates a trigger signal. In one example, the trigger is attached to the sample chute 13 and includes an optical transmitter and an optical receiver. In operation, the sample 17 interferes with the light traveling between the optical transmitter and the optical receiver as sample 17 travels along sample chute 13. This interference in received light is sensed by the optical receiver when the transmitted light does not irradiate the optical receiver. In response to detecting the interference in received light, the trigger generates a trigger signal. The trigger signal can be an electric signal that propagates along a conductor, or the trigger signal can be an electro-magnetic signal that propagates across free space to a receiving terminal. The duration between the time when the trigger signal is generated and the time when the sample 17 intersects the focal plane is based on where the trigger is located relative to the focal plane of the camera pairs. Once the trigger location is selected the duration between the time when the trigger signal is generated and the time when the sample 17 intersects the focal plane can be empirically measured or calculated. Once the duration between when the trigger signal is generated and the time when the sample 17 intersects the focal plane has been determined, the trigger signal can be used to determine the future time when the sample 17 will intersect the focal plane. This timing information can be used to properly control the various light sources and cameras in the in-flight 3D inspector.

The trigger is not shown in FIG. 5. However, a system diagram of the triggering system is illustrated in FIG. 6. FIG. 6 is a diagram of a double stereo camera system configuration with triggering. The triggering system includes trigger 30, controller 31 and/or computer system 12, cameras 21-24 and light sources 8-9 and 15-16. In one example, the trigger signal 32 (i) causes light sources 8, 9, 15, and 16 to turn on, and (ii) causes the first camera pair 18 and the camera pair 19 to capture an image when the sample 17 intersects in the focal plane. In another example, light sources 8, 9, 15 and 16 are already on and the trigger signal 32 only causes the first camera pair 18 and the camera pair 19 to capture an image when the sample 17 intersects in the focal plane.

In a first embodiment, the trigger signal is communicated from the trigger 30 to a controller 31 that controls when the first camera pair 18 and the second camera pair 19 capture images. In a second embodiment, the trigger signal 32 is communicated from the trigger 30 directly to the first camera pair 18 and the second camera pair 19 and causes the camera pairs 18 and 19 to capture images. In a third embodiment, the trigger signal 32 is communicated from the trigger 30 to computer system 12 that controls when the first camera pair 18 and the second camera pair 19 capture images.

In a fourth embodiment, the trigger signal is communicated from the trigger 30 to a controller 31 that controls when the light sources 8-9 and 15-16 are turned on. The controller 31 acts as a switch that connects an output power terminal of a power supply included in power management module 14 to a power input terminal of each light source 8-9 and 15-16. The controller switch turns ON the light sources in response to receiving the trigger signal. After the sample has passed though the focal plane, the controller turns OFF the light sources by disconnecting the output power terminal of the power supply from the power input terminal of each light source.

In a fifth embodiment, the trigger signal 32 is communicated from the trigger 30 directly to the light sources 8-9 and 15-16 and causes the light sources 8-9 and 15-16 to turn ON. In this embodiment, each light source 8-9 and 15-16 is configured to receive a power signal and an ON/OFF signal. The ON/OFF signal is controlled by the trigger signal. The light sources may include a timer circuit that is used to turn OFF the light sources after the sample has passed through the focal plane.

In a sixth embodiment, the trigger signal 32 is communicated from the trigger 30 to computer system 12 that controls when the light sources 8-9 and 15-16 are turn on. In this embodiment, each light source 8-9 and 15-16 is configured to receive a power signal and an ON/OFF signal. The ON/OFF signal is output by the computer system 12 in response to receiving the trigger signal from the trigger.

The light sources may be controlled such that the light sources turn on after the camera shutters are opened and turn off before the camera shutters are closed.

Controller 31 may be configured to communicate with computer system 12 via an RS232 communication link, an ethernet communication link, an Universal Serial Bus (USB) communication link, or any other available data communication links.

Figure 7:
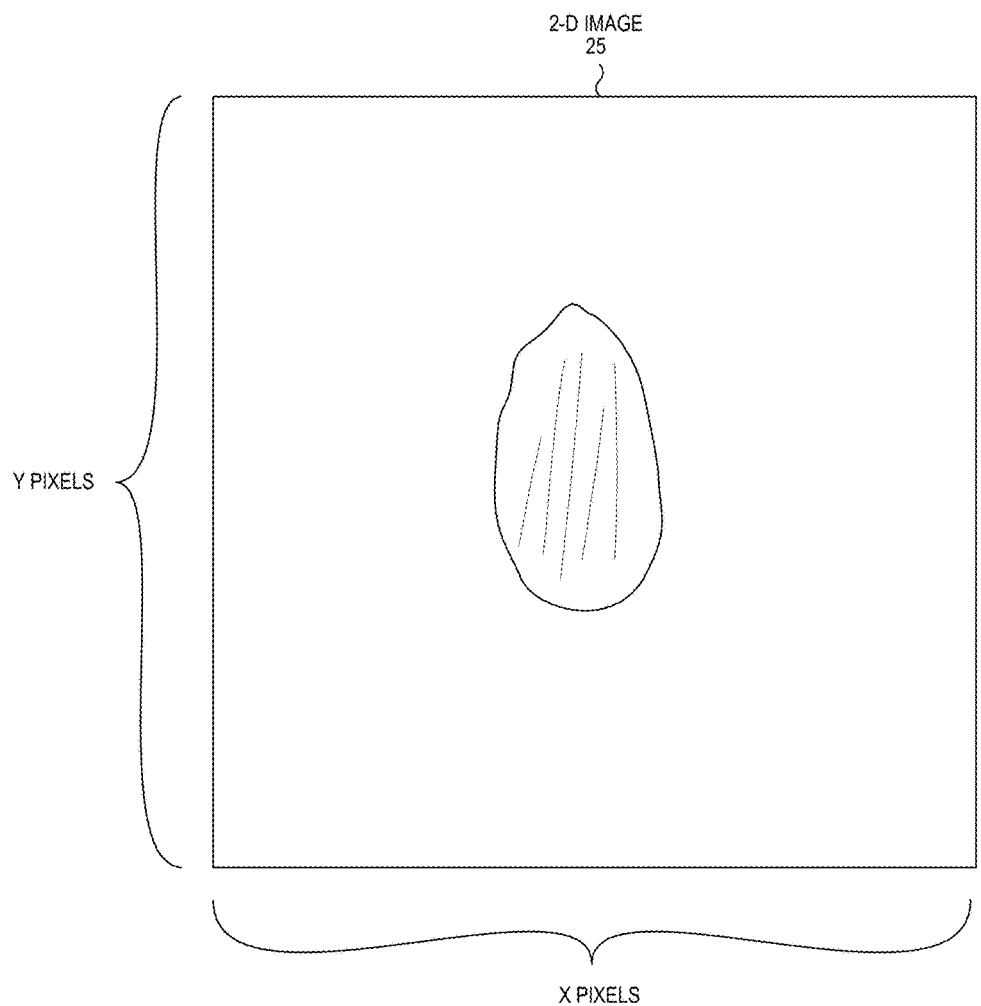
FIG. 7 is an image captured by a first camera of the double stereo camera system.
Figure 8:
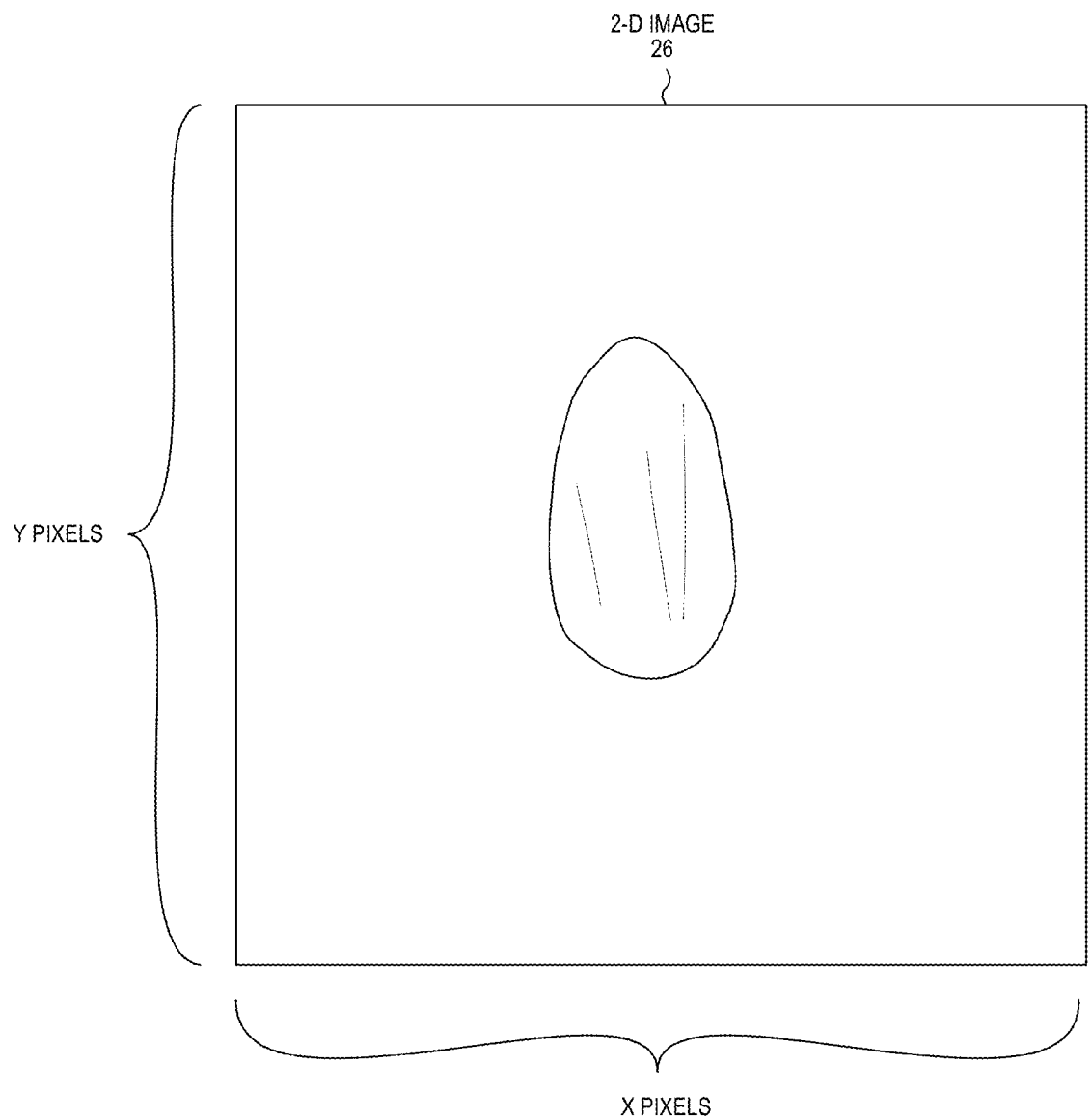
FIG. 8 is an image captured by a second camera of the double stereo camera system.
Figure 9:
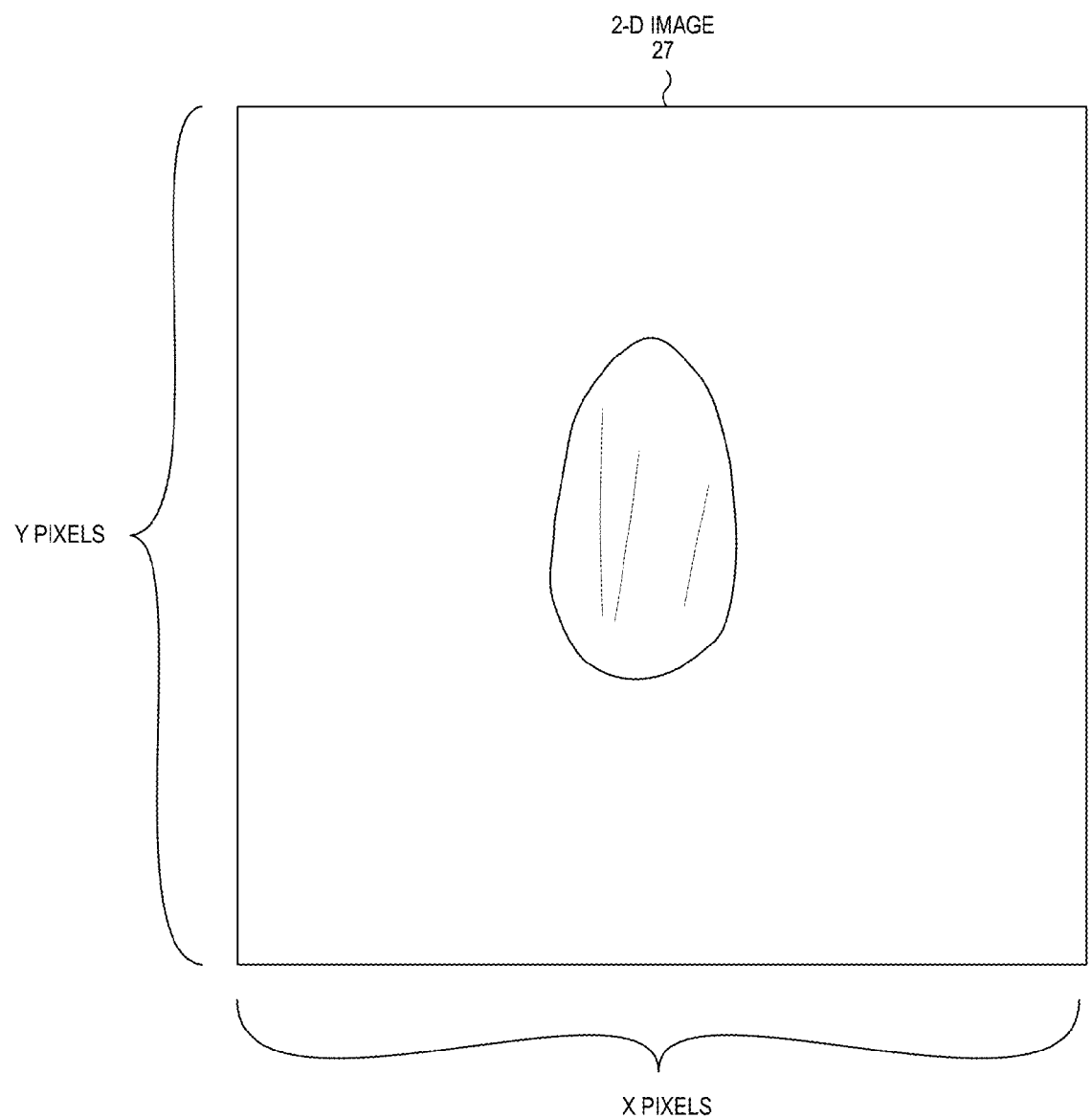
FIG. 9 is an image captured by a third camera of the double stereo camera system.
Figure 10:
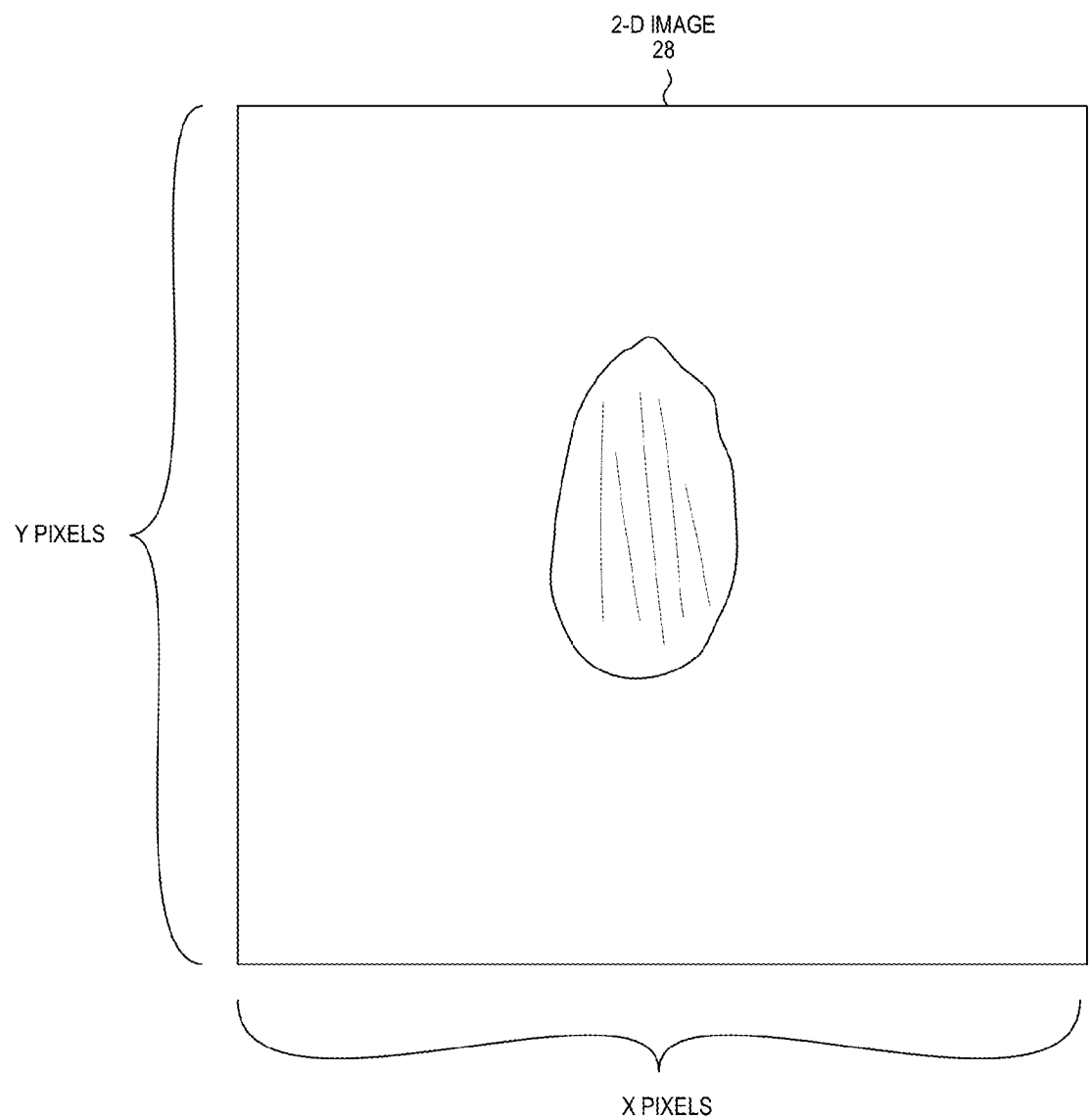
FIG. 10 is an image captured by a fourth camera of the double stereo camera system.

When the sample 17 travels through the focal plane, sample 17 is not contacting any surface. At this point in time, the light sources 8-9 and 15-16 are turned on and the first camera pair 18 and the second camera pair 19 capture at least one image of the sample. Each camera captures an image from a unique angle at the same moment in time as the sample travels through the focal plane. FIG. 7 is an image captured by a first camera of the double stereo camera system. FIG. 8 is an image captured by a second camera of the double stereo camera system. FIG. 9 is an image captured by a third camera of the double stereo camera system. FIG. 10 is an image captured by a fourth camera of the double stereo camera system. Each of these images is stored on a memory device located on the in-flight 3D inspector. On one example, the memory device is located within the computer system 12. It is noted that the captured images may only be temporarily stored on a memory device within the in-flight 3D inspector before being communicated across a network to another storage device located outside of the in-flight 3D inspector. For example, the captured images stored on a storage device within the computer system 12 may be communicated across RJ-45 connector 10 and a local network to another storage device not included in the in-flight 3D inspector. In this fashion, multiple images of the sample 17 are captured from four different angles at the same moment while the sample 17 is traveling through the focal plane while not in contact with any surface.

Capturing of images while the sample is not contacting any surface provides a great benefit. When the sample is not contacting any surface, images of each surface of the sample can be collected at the same moment in time. This is not possible in other image capturing systems. For example, when a sample is moved along a conveyer belt image of only one side of the sample may be captured at any one moment in time. View of the other side of the sample is blocked by the conveyer belt and therefore cannot be captured at the same moment in time. Capturing images of all surfaces of the sample at the same moment in time allows for generation of high quality 3D images of the sample. When images of various surfaces of the sample are taken at different moments in time, proper alignment of images is very difficult, requires additional processing and result in 3D images with lower quality due to introduced error.

The cameras communicate the captured images to the controller 31 or computer system 12 via bus. In one example, the bus is an Universal Serial Bus (USB). In another example, the bus is an IEEE 1394 "FireWire" bus.

In one example, the cameras are Charged Coupled Device (CCD) cameras. In another example, the cameras are Complementary Metal-Oxide Semiconductor (CMOS) cameras. In yet another example, the cameras are Indium Gallium Arsenide (InGaAs) cameras that are capable of measuring Short Wave Infra Red (SWIR) light.

Either line scan cameras and area scan cameras can be used to implement an in-flight 3D inspector. A line scan cameras contain a single row of pixels used to capture data very quickly. As the object moves past the camera, a complete image can be reconstructed in software line by line. Area scan cameras contain a matrix of pixels that capture an image of a given scene. They are more general purpose than line scan cameras, and offer easier setup and alignment.

It is noted herein that the light sources may each include a separate power source that drives the light when a control signal is received. Alternatively, each light source may be configured in an always on state where the power input terminal on each light source is coupled to an output terminal of a power supply where the output of the power supply is controlled by a control signal.

It is noted that the sample chute 13 is only one example how the sample can be directed to the focal plane. In a first alternative embodiment, the sample can be directed to the focal plane by use of a conveyer belt. In this first alternative embodiment, the sample would be directed from the sample input funnel to the conveyer belt, which in turn would propel the sample off the edge of the conveyer belt toward the focal plane. In a second alternative embodiment, the sample can be directed to the focal plane by use of an airburst. In this second alternative embodiment, the sample would be directed proximate to an airburst source, which in turn would propel the sample toward the focal plane. One example of an airburst source is a highly pressurized air tank connected to an electronically controlled valve, which outputs an airburst momentarily while the valve is open.

Sample Collection/Sorting

Once the sample 17 passes the focal plane, the sample 17 falls into collector bin 11. In one example, a collector bucket 20 is placed in collector bin 11. In this example, the sample 17 falls into the collector bucket 20. Additional samples placed into sample input funnel 4 make their way through the in-flight 3D inspector and eventually also fall into collector bucket 20. Once all samples have passed through the in-flight 3D inspector, a user can remove all samples by removing the collector bucket 20 from the collector bin 11.

In another example, a collector bucket 20 is not placed in collector bin 11. Rather, collector bin 11 is coupled to a sample sorting machine (not shown). In this example, the samples that pass through the in-flight 3D inspector are routed into different bins. The bin each sample is routed into is based on the images captured of the sample. In the event that the images of the sample indicate that the sample has a first type of defect, then the sample is routed to a first bin. In the event that the images of the sample indicate that the sample has a second type of defect, then the sample is routed into a second bin. Alternatively, in the event that the images of the sample indicate that the sample does not have any defects, then the sample is routed to a third bin. The sorting machine can route the samples using various different methods. A first method of routing includes using a burst of air to redirect the trajectory of a sample as it falls into the collector bin. A second method of routing includes using a mechanically controlled flap to redirect the trajectory of a sample as it falls into the collector bin.

3D Image Generation

Once the images are captured from each of the cameras, a 3D image of the sample can be created. In one example, the 3D image is generated by the computer system 12 included in the in-flight 3D inspector. In another example, the 3D image is generated by another computer system not included in the in-flight 3D inspector after the images are communicated across a network from the in-flight 3D inspector to the computer system not included in the in-flight 3D inspector.

The images captured by the first camera pair 18 are used to create a 3D image of a first side of the sample. The images captured by the second camera pair 19 are used to create a 3D image of the second side of the sample. In one example, data included in the captured 2D images are combined into a new dataset and missing information is added to complete the 3D information of the object: depth (distance). By using triangulation on matching pixels of the multiple 2D images captured by the in-flight 3D inspector, the depth component is derived and added to the dataset. This new dataset describes the object in 3D. This dataset is then used by advanced mathematical algorithms to describe the characteristics of the objects. The 3D images of the first and second sides of the sample are combined to create a 3D image of the entire sample. Once the 3D image of the entire sample is constructed, the 3D image can be analyzed to determine if various types of defects are present on the sample. For example, if the 3D image does not match a predetermined shape within a specified tolerance, then the sample is determined to be defective with respect to shape. In another example, if the 3D image shows a flat surface greater than a specified area, then the sample is determined to be defective with respect to surface contour.

Once the defect information is determined based on the 3D image of the sample, the defect information is stored with the 3D image. The defect information can be displayed on display 2 to a user of the in-flight 3D inspector. The defect information can also be used to generate a report indicating the number of defects detected across a multiple samples that have been inspected. The defect information for each sample can be used by a sorting machine attached to the collector bin 11 of the in-flight 3D inspector to determine how the sample is to be routed. The defect information for multiple samples can be used to generate a quality report indicating the quality grade of the multiple samples.

Various calibrations of the cameras may be performed. An internal calibration may be performed for each camera. Internal calibration includes calibration of principle points, focal lengths, pixel size ratios, and radial parameters. A stereo calibration may be performed as well. A stereo calibration addresses the external 3D rotation and translation between individual cameras of a stereo system. An inter-stereo calibration may also be performed to address the external 3D rotation and translation between the two stereo systems. In an inter-stereo calibration, a transformation is performed that stitches two different side reconstructions into one 3D model.

Capturing Images of Multiple samples in a Single Image

The single sample chute 13 illustrated in FIG. 5 illustrates one embodiment of the present invention. In another embodiment (not shown in FIG. 5) the sample chute may be configured to direct multiple samples through the focal plane at the same moment in time. In this embodiment, the sample chute would cause multiple samples to fall through the focal plane along a single axis at the same time. Aligning the samples along a single axis prevents one sample from blocking a camera's view of another sample. The first and second camera pairs would then capture an image including multiple samples instead of just one. Said another way, a single image would include multiple samples instead of just one. Once the images of the multiple samples are captured, the computer system 12 would (i) determine which portions of each image are of each sample, and (ii) only use the portions of each image that are of the same sample to generate the 3D image of the sample.

This configuration would greatly accelerate the rate at which the in-flight 3D inspector can capture images of multiple samples. For example, if the sample chute directed ten samples through the focal plane as the same time instead of only one sample, then the in-flight 3D inspector would be able to collect images of samples ten times faster. Said another way, the in-flight 3D inspector would only require one-tenth the amount of time to collect images of a set of samples.

Figure 11:
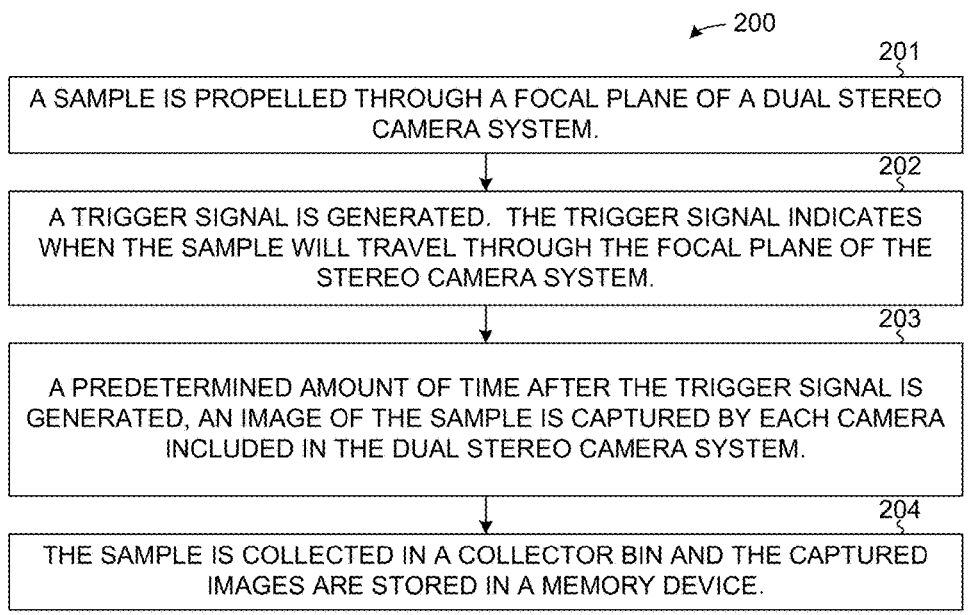
FIG. 11 is a flowchart of a in-flight 3D inspector.

FIG. 11 is a flowchart 200 of an in-flight 3D inspector. In step 201, a sample is propelled through a focal plane of a dual stereo camera system. In step 202, a trigger signal is generated. The trigger signal indicates when the sample will travel through the focal plane of the stereo camera system. In step 203, a predetermined amount of time after the trigger signal is generated, an image of the sample is captured by each camera included in the dual stereo camera system. The sample is illuminated by a light source while the image of the sample is captured. In step 204, the sample is collected in a collector bin and the captured images are stored in a memory device.

Figure 12:
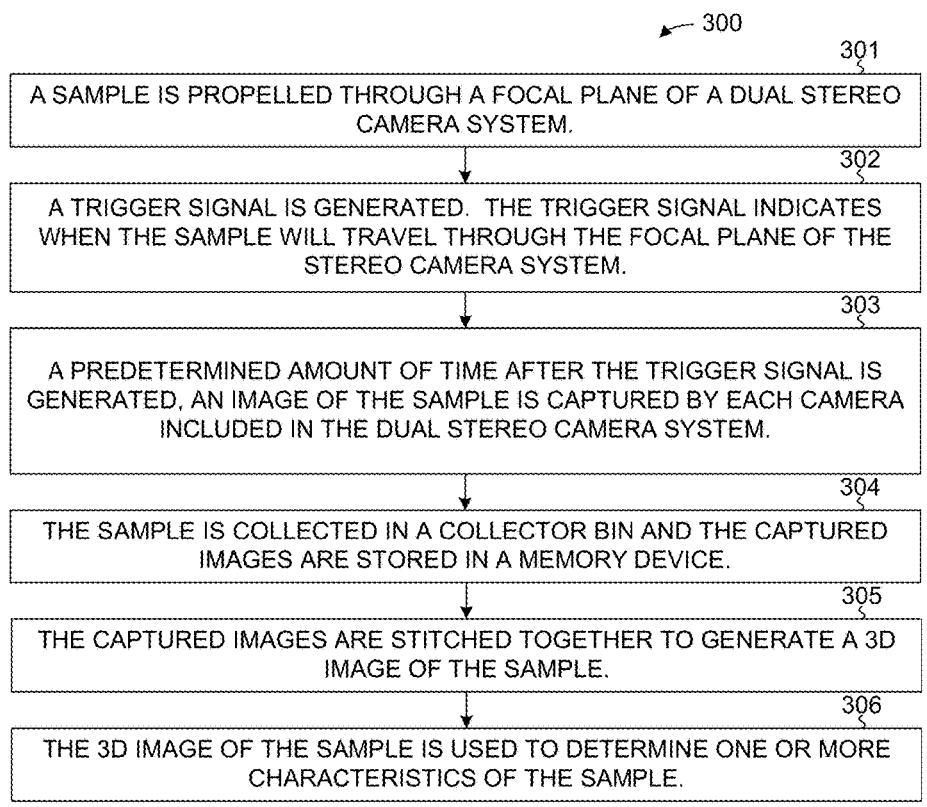
FIG. 12 is a flowchart of a in-flight 3D inspector with defect processing.

FIG. 12 is a flowchart 300 of an in-flight 3D inspector with defect processing. In step 301, a sample is propelled through a focal plane of a dual stereo camera system. In step 302, a trigger signal is generated. The trigger signal indicates when the sample will travel through the focal plane of the stereo camera system. In step 303, a predetermined amount of time after the trigger signal is generated, an image of the sample is captured by each camera included in the dual stereo camera system. The sample is illuminated by a light source while the image of the sample is captured. In step 304, the sample is collected in a collector bin and the captured images are stored in a memory device. In step 305, the captured images are stitched together to generate a 3D image of the sample. In step 306, the 3D image of the sample is used to determine one or more characteristics of the sample.

Various Numbers of Cameras Can Be Used

The two pairs of cameras 18-19 discussed above are used in a first embodiment of the present invention. In other embodiments, various other numbers of cameras may be used. For example, in another embodiment, the in-flight 3D inspector may include only one pair of stereo cameras that capture two images of the sample and the images are used to construct a 3D image of the sample from only one point of view. In another embodiment, three pairs of stereo cameras can be used to capture six images of the sample and the images are used to construct a 3D image of the sample from three points of view. After review of this disclosure, the reader will appreciate that additional cameras will provide additional accuracy of the 3D image created by the in-flight 3D inspector.

Inspection Device Controlled Processing Line System

Figure 13:
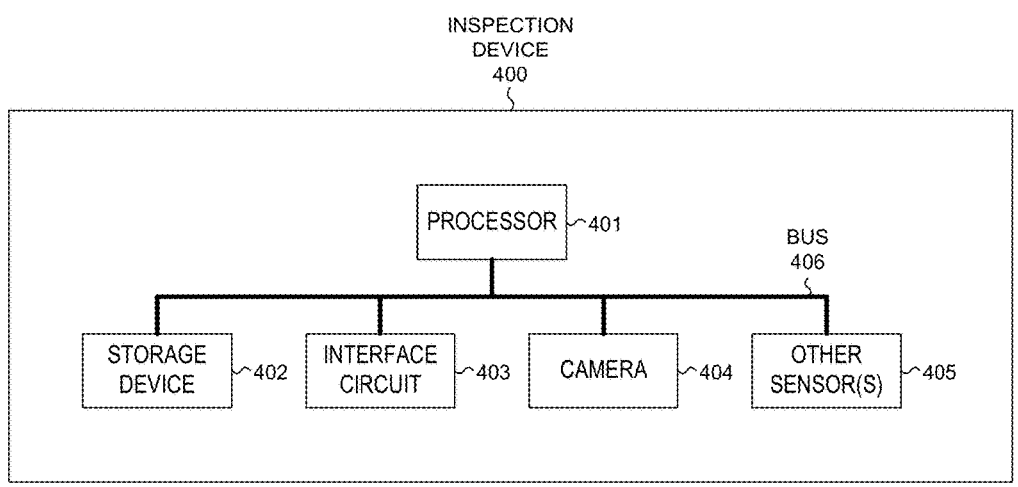
FIG. 13 is a diagram of an inspection device.

FIG. 13 is a diagram of an inspection device 400. Inspection device 400 includes a processor 401, a storage device 402, an interface circuit 403, an optical device 404 and/or other sensors 405. The various parts of inspection device 400 communicate with each other across a bus 406. On skilled in the art will note that various known bus architectures can be used to implement inspection device 400. One example of a bus architecture is Peripheral Component Interconnect Express (PCIe), which provides standardized communication between various device components. However, many other possible options exist, such as: Ethernet for Control Automation Technology (EtherCAT), Ethernet Industrial Protocol (EtherNet/IP), Process Field Net (PROFINET), Ethernet Powerlink, Third Generation of the Sercos Interface (SERCOS III), Control and Communication Link (CC-Link IE), and Modbus/TCP, Modbus, Sinec H1, Process Field Bus (Profibus), Controller Area Network Protocol (CANopen), DeviceNet, and FOUNDATION Fieldbus. One example of a processor is an intel x86 processor. One example of a storage device is a NAND flash based solid state drive. One example of an interface circuit is a Network Interface Card (NIC) that communicates across a physically connected cable to a network switch or router. Another example of an interface circuit is a Wireless Network Interface Controller (WNIC) that communicates across standards such as WiFi (802.11 protocols), Bluetooth and other such protocols. Another example of an interface circuit is a cellular communication device that communicates across cellular networks that use protocols such as GSM, WCDMA, CDMA2000, LTE, etc. An example of an optical device is a high shutter speed, high resolution digital camera that is controllable by a computer across a standardized data port, such as USB. Other examples of optical devices include, but are not limited to, millimeter wave cameras, Near-Infr-Red (NIR) cameras, hyper-spectral cameras, and x-ray cameras. Other sensors 405 may include audio, electromagnetic, and odor sensors that are controllable by a computer across a standardized bus, such as USB. Other examples of sensors include, but are not limited to weight scale sensors, proximity sensors, temperature sensors, humidity sensors, texture sensors, and moisture sensors.

FIG. 14 illustrates an inspection data communication system. The inspection data communication can be between inspection device 412 and upstream slave device 411 or between inspection device 412 and downstream slave device 413. The terms upstream indicates that sample pass through the slave device before passing through the inspection device 412. The term downstream indicates that samples pass through the inspection device 412 before passing through the salve device.

It is noted herein, that a slave device is any device located along the sample processing line. Examples of a slave devices includes, but is not limited to: a sorting device, a mixing device, a display device, a sizing device, a blanching device, a feeding device, a cutting, a slicing device, a baking device, a drying device, a freezing device, a coating device, a washing device.

In one scenario, a sample passes through the slave device 411 and then passes through the inspection device 412. Within the inspection device 412, the optical device 404 of the inspection device 400 is triggered by the processor 401 to capture an image. The triggering by the processor 401 is executed when a sample is within the field of view of the optical device 404. The image captured by the optical device 404 is then stored into storage device 402. The processor 401 then processes the captured image and determines one or more quality characteristics of the sample in the captured image. Many different quality characteristics may be determined from the captured image. Some examples of possible quality characteristics includes, but are not limited to: shape quality (based on matching a predetermined shape within a specified tolerance, then the sample is determined to be defective with respect to shape), surface contour quality (when a flat surface is greater than a specified area, then the sample is determined to be defective with respect to surface contour), hole quality (presence of holes in the sample), pest quality (presence of insects in/or on the sample), color quality (irregular color of the sample), size quality (irregular size of the sample), moisture level, oil content, fat content, and mycotoxin content. In one example, a group of quality characteristics are referred to as inspection data 415. FIG. 18, FIG. 19, and FIG. 20 illustrate various examples of inspection data. Communication medium 417 can be a wired medium such as ethernet or RS-232. Alternatively, communication medium 417 can be wireless medium such as WiFi (802.11) or a cellular link. The inspection data 415 is then communicated to slave device 411. In this fashion, the slave device 411 can then analyze the inspection data and adjust the operation of slave device 411 such that more desirable samples are output from slave device 411. This scenario requires that slave device 411 include some local knowledge and processing capability to analyze the received inspection data and to adjust the operations of the slave device 411 based on the analysis.

It is noted herein, the inspection device 400 illustrated in FIG. 13 is only one example of an inspection device. Another example of an inspection device is the in-flight 3D inspector 1 illustrated in FIGS. 1-5.

It is also noted herein, that multiple samples may be within the field of view of the optical device 404 when an image is captured and therefore quality characteristics of multiple samples may be determined using a single captured image.

In another scenario, a sample passes through the inspection device 412 and then passes through the slave device 413. Within the inspection device 412, the optical device 404 of the inspection device 400 is triggered by the processor 401 to capture an image. The triggering by the processor 401 is executed when a sample is within the field of view of the optical device 404. The image captured by the optical device 404 is then stored into storage device 402. The processor 401 then processes the captured image and determines one or more quality characteristics of the sample in the captured image. Many different quality characteristics may be determined from the captured image. In one example, multiple quality characteristics are referred to as inspection data 415. The inspection data 415 is then communicated to slave device 413 via communication medium 417. Communication medium 417 can be a wired medium such as ethernet or RS-232. Alternatively, communication medium can be wireless medium such as WiFi (802.11) or cellular link In this fashion, the slave device 413 can then analyze the inspection data and adjust the operation of slave device 413 such that more desirable samples are output from slave device 413. This scenario requires that slave device 413 include some local knowledge and processing capability to analyze the received inspection data and to adjust the operations of the slave device 413 based on the analysis.

While the scenario illustrated in FIG. 14 provides the slave devices 411 and 413 with the most control over how they operate, in many instances slave devices 411 and 413 will not have the necessary knowledge and processing power to analyze the inspection data generated by the inspection device 412. This problem is addressed by moving the processing of the inspection data to the inspection device 412. This solution is illustrated in FIG. 15.

Figure 15:
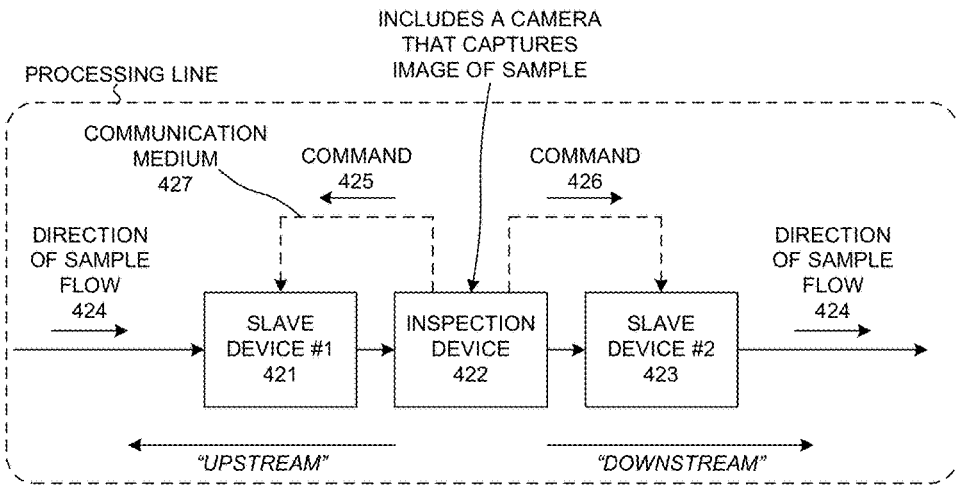
FIG. 15 is a diagram of a command communication system.
Figure 21:
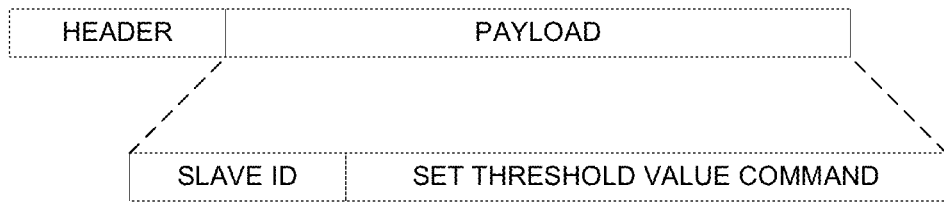
FIG. 21 is a diagram of a first example of a command based on inspection data.
Figure 22:
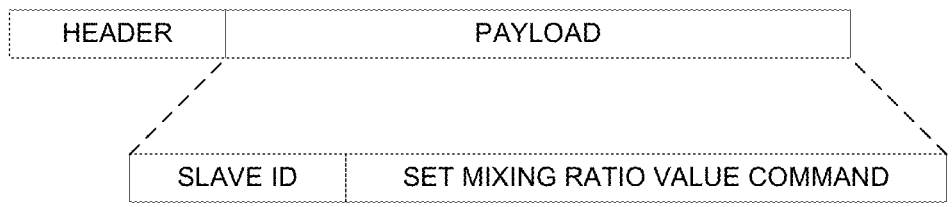
FIG. 22 is a diagram of a second example of a command based on inspection data.
Figure 23:
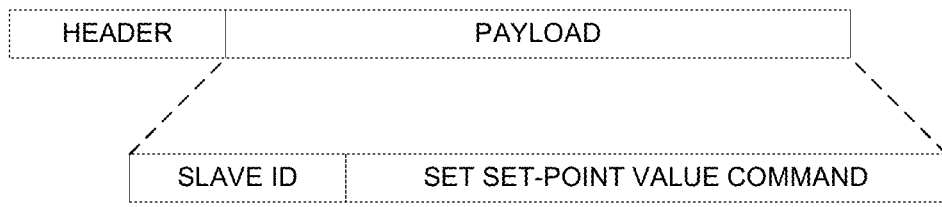
FIG. 23 is a diagram of a third example of a command based on inspection data.

FIG. 15 illustrates a command communication system. The terms upstream indicates that sample pass through the slave device before passing through the inspection device 422. The term downstream indicates that samples pass through the inspection device 422 before passing through the slave device. In this system, a sample passes through the slave device 411 and then passes through the inspection device 412. Within the inspection device 412, the optical device 404 of the inspection device 400 is triggered by the processor 401 to capture an image. The triggering by the processor 401 is executed when a sample is within the field of view of the optical device 404. The image captured by the optical device 404 is then stored into storage device 402. The processor 401 then processes the captured image and determines one or more quality characteristics of the sample in the captured image. In one example, multiple quality characteristics are referred to as inspection data. Instead of communicating the raw inspection data to the slave device 421, the inspection device 422 performs the analysis of the inspection data and generates a command 425 to adjust the operation of slave device 421. FIG. 21, FIG. 22, and FIG. 23 illustrate various examples of commands that are generated based on inspection data. For example, a command may be to set a threshold value to be used by a slave device. In another example, a command may be to set a mixing ratio value in a slave device. In yet another example, the command may be to adjust a set-point value in a slave device. The command 425 is then communicated to slave device 421 via communication medium 427. Slave device 421 then adjusts operation as commanded such that more desirable samples are output from slave device 421. This scenario does not require that slave device 421 include some local knowledge and processing capability to analyze inspection data and to adjust the operations of the slave device 421 based on the analysis. Rather, this scenario does not require any local knowledge or processing capability to be present on the slave device 421, because all the necessary analysis is performed by the inspection device 422. Slave device 421 can operate as a "dumb" terminal that simply adjusts operation based on received commands from the inspection device 422. This solution may be very valuable as it reduces the number of devices that are required to have local processing capability and knowledge, which in turn reduces the cost of the overall system.

In another scenario, a sample passes through the inspection device 422 and then passes through the slave device 423. Within the inspection device 412, the optical device 404 of the inspection device 400 is triggered by the processor 401 to capture an image. The triggering by the processor 401 is executed when a sample is within the field of view of the optical device 404. The image captured by the optical device 404 is then stored into storage device 402. The processor 401 then processes the captured image and determines one or more quality characteristics of the sample in the captured image. In one example, multiple quality characteristics are referred to as inspection data. Instead of communicating the raw inspection data to the slave device 423, the inspection device 422 performs the analysis of the inspection data and generates a command 426 to adjust the operation of slave device 423. The command 426 is then communicated to slave device 423 via a communication medium. Slave device 423 then adjusts operation as commanded such that more desirable samples are output from slave device 423. This scenario does not require that slave device 423 include some local knowledge and processing capability to analyze inspection data and to adjust the operations of the slave device 423 based on the analysis. Rather, this scenario does not require any local knowledge or processing capability to be present on the slave device 423, because all the necessary analysis is performed by the inspection device 422. Slave device 423 can operate as a "dumb" terminal that simply adjusts operation based on received commands from the inspection device 422. This solution may be very valuable as it reduces the number of devices that are required to have local processing capability and knowledge, which in turn reduces the cost of the overall system.

Figure 16:
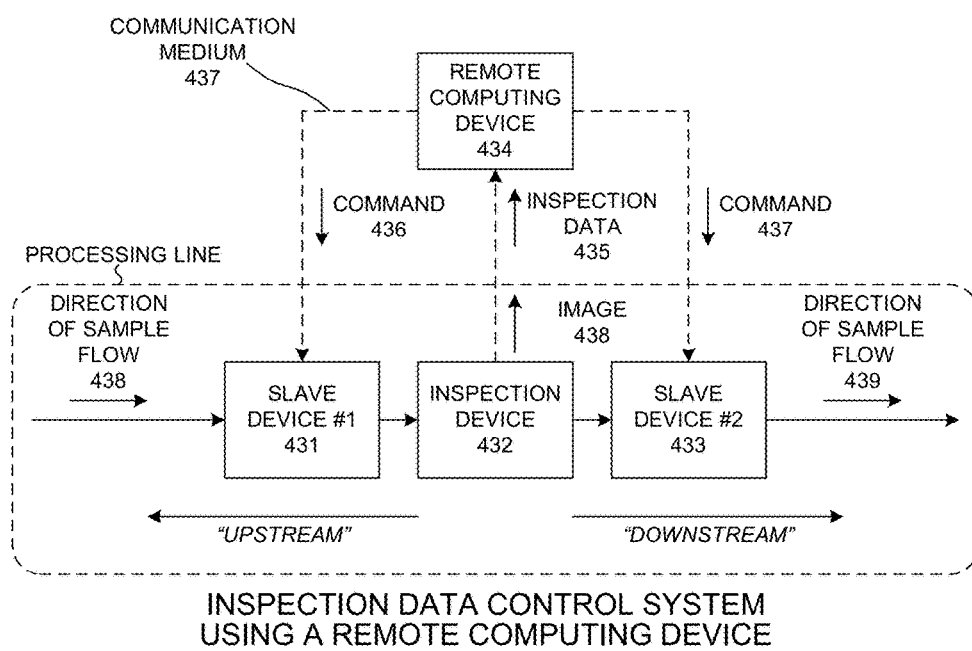
FIG. 16 is a diagram of an inspection data control system using a remote computing device.

While the scenario illustrated in FIG. 15 provides cost saving by only requiring a single device in the system to have the necessary knowledge and processing power, it may be even more advantageous if the none of the devices in the system are required to have local processing capability and knowledge to analyze the captured images. FIG. 16 illustrates an inspection data control system using a remote computing device.

FIG. 16 illustrates an inspection data control system using a remote computing device. The terms upstream indicates that sample pass through the slave device before passing through the inspection device 432. The term downstream indicates that samples pass through the inspection device 432 before passing through the salve device. In this system, a sample passes through the slave device 431 and then passes through the inspection device 432. Within the inspection device 432, the optical device 404 of the inspection device 400 is triggered by the processor 401 to capture an image 438. The triggering by the processor 401 is executed when a sample is within the field of view of the optical device 404. The image 438 captured by the optical device 404 is then stored into storage device 402. The processor 401 does not process the captured image 438 to determine one or more quality characteristics of the sample in the captured image 438. Rather, the inspection device 432 communicates the captured image 438 to a remote computing device 434. In one example, remote computing device 434 is a remote computer or server that is not part of any machine through which the sample flows. In response to receiving the captured image 438, the remote computing device 434 performs the analysis of the captured image 438 and generates a command 436 to adjust the operation of slave device 431. The command 436 is then communicated to slave device 431 via communication medium 437. Slave device 431 then adjusts operation as commanded such that more desirable samples are output from slave device 431. This scenario does not require any local knowledge or processing capability to be present on the slave device 431, because all the necessary analysis is performed by the remote computing device 434 Likewise, this scenario does not require any local knowledge or processing capability to be present on the inspection device 432, because all the necessary analysis is performed by the remote computing device 434. Both slave device 431 and inspection device 432 can operate as "dumb" terminals that simply adjust operation based on received commands from the remote computing device 434. This solution may be very valuable as it does not require any devices through which the sample passes to have local processing capability and knowledge, which in turn reduces the cost of the overall system.

In another scenario, a sample passes through the inspection device 432 and then passes through the slave device 433. Within the inspection device 432, the optical device 404 of the inspection device 400 is triggered by the processor 401 to capture an image 438. The triggering by the processor 401 is executed when a sample is within the field of view of the optical device 404. The image 438 captured by the optical device 404 is then stored into storage device 402. The processor 401 does not process the captured image 438 to determine one or more quality characteristics of the sample in the captured image. Rather, the inspection device 432 communicates the captured image 438 to a remote computing device 434. In one example, remote computing device 434 is a remote computer or server that is not part of any machine through which the sample flows. In response to receiving the captured image 438, the remote computing device 434 performs the analysis of the captured image 438 and generates a command 437 to adjust the operation of slave device 433. The command 437 is then communicated to slave device 433 via communication medium. Slave device 433 then adjusts operation as commanded such that more desirable samples are output from slave device 433. This scenario does not require any local knowledge or processing capability to be present on the slave device 433, because all the necessary analysis is performed by the remote computing device 434. Likewise, this scenario does not require any local knowledge or processing capability to be present on the inspection device 432, because all the necessary analysis is performed by the remote computing device 434. Both slave device 433 and inspection device 432 can operate as "dumb" terminals that simply adjust operation based on received commands from the remote computing device 434. This solution may be very valuable as it does not require any devices through which the sample passes to have local processing capability and knowledge, which in turn reduces the cost of the overall system.

In another example, captured image 438 is not communicated from the inspection device 432 to the remote computing device 434, but rather inspection data 435 is communicated from the inspection device 432 to remote computing device 434. In this scenario, the inspection device 432 captures an image of the sample and from the captured image determines quality characteristic(s) of the sample. The inspection data (grouping of quality characteristics) is then communicated to the remote computing device 434. In response to receiving the inspection data, the remote computing device 434 generates one or more commands to adjust one or more slave devices. In this example, the inspection device 432 requires the processing capability to determine the quality characteristics, but does not require the capability to determine commands for adjusting slave devices.

While the scenario illustrated in FIG. 16 a great improvement, a remote computing device can be used in an even more beneficial way. This improved use is illustrated in FIG. 17.

Figure 17:
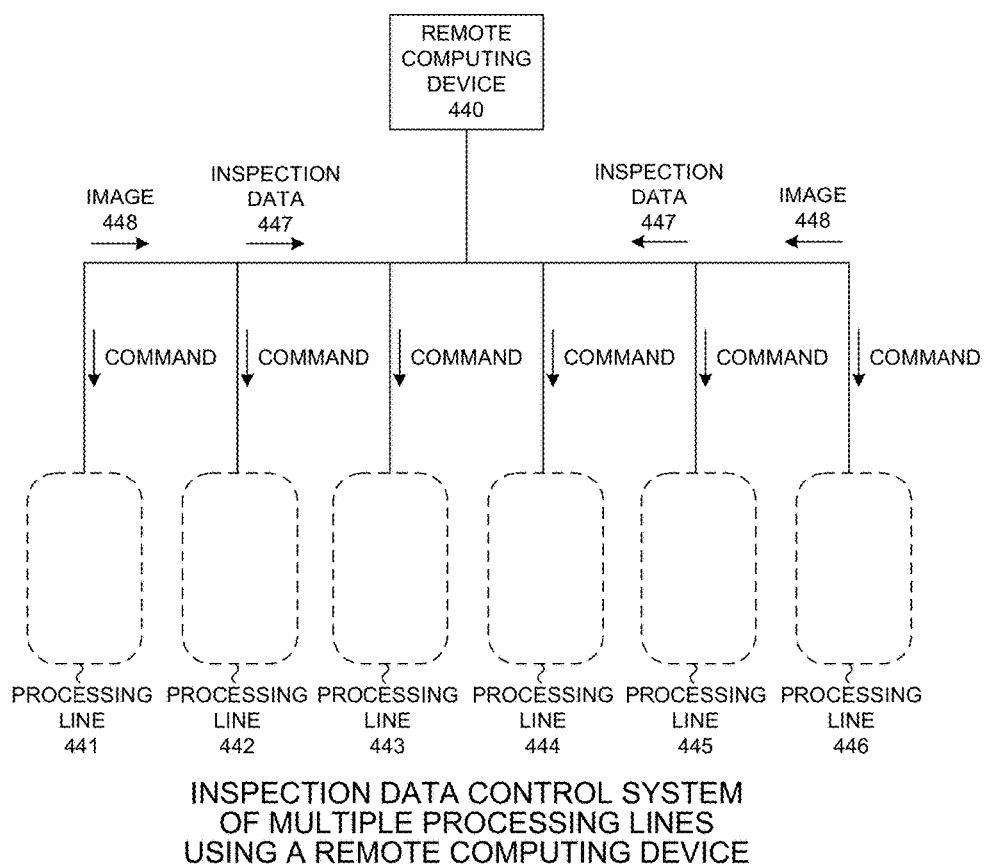
FIG. 17 is a diagram of an inspection data control system of multiple processing lines using a remote computing device.

FIG. 17 illustrates an inspection data control system of multiple processing lines using a remote computing device. Each processing line 441-446 includes at least one inspection device that is capable of capturing an image and sending the capture image and/or inspection data based on the captured image to a remote computing device 440.

The in response to receiving only the captured image data 448, the remote computing device 440 determines quality characteristics and then based on those quality characteristics ("inspection data") the remote computing device 440 generates command(s) to adjust the operation of slave device(s) in the processing line from which the image was captured.

In response to receiving the inspection data 447, the remote computing device 440 generates command(s) to adjust the operation of slave device(s) in the processing line from which the image was captured.

This scenario also reduces the complication of managing multiple sample processing lines. A single remote computing device 440 could receive inspection data from various inspection devices included in various processing lines 441-446. In this fashion, the single remote computing device 440 could monitor and adjust all the various slave devices in processing lines 441-446. This scenario can also provide for advanced learning because all inspection data from all processing lines 441-446 are received by the remote computing device 440, which in turn allows for improved artificial intelligence learning by way of access to larger sets of relevant inspection data.

This scenario also allows for real-time monitoring and adjusting of multiple processing lines located at various locations around the world.

Figure 24:
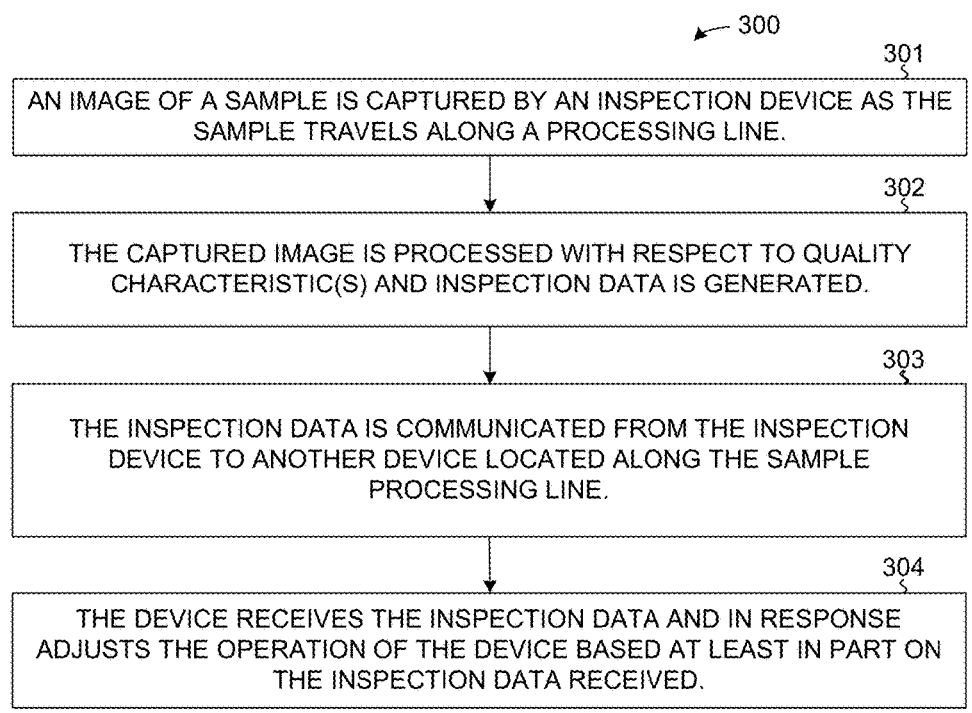
FIG. 24 is a flowchart illustrating the operation of an inspection data communication system.

FIG. 24 is a flowchart 300 of an inspection data communication system. In step 301, an image of a sample is captured by an inspection device as the sample travels along a processing line. In step 302, the captured image is processed with respect to quality characteristic(s) and inspection data is generated. In step 303, the inspection data is communicated from the inspection device to another device located along the sample processing line. In step 304, the device receives the inspection data and in response adjusts the operation of the device based at least in part on the inspection data received.

Figure 25:
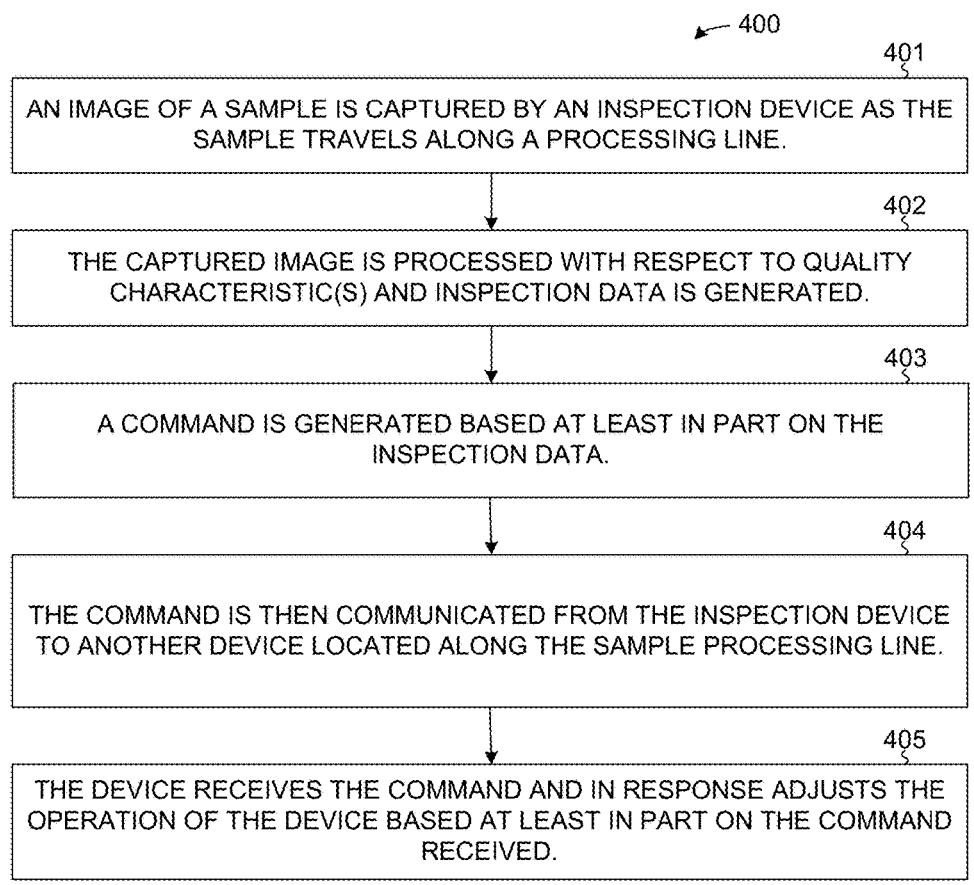
FIG. 25 is a flowchart illustrating the operation of a command communication system.

FIG. 25 is a flowchart 400 of a command communication system. In step 401, an image of a sample is captured by an inspection device as the sample travels along a processing line. In step 402, the captured image is processed with respect to quality characteristic(s) and inspection data is generated. In step 403, a command is generated based at least in part on the inspection data. In step 404, the command is then communicated from the inspection device to another device located along the sample processing line. In step 405, the device receives the command and in response adjusts the operation of the device based at least in part on the command received.

Figure 26:
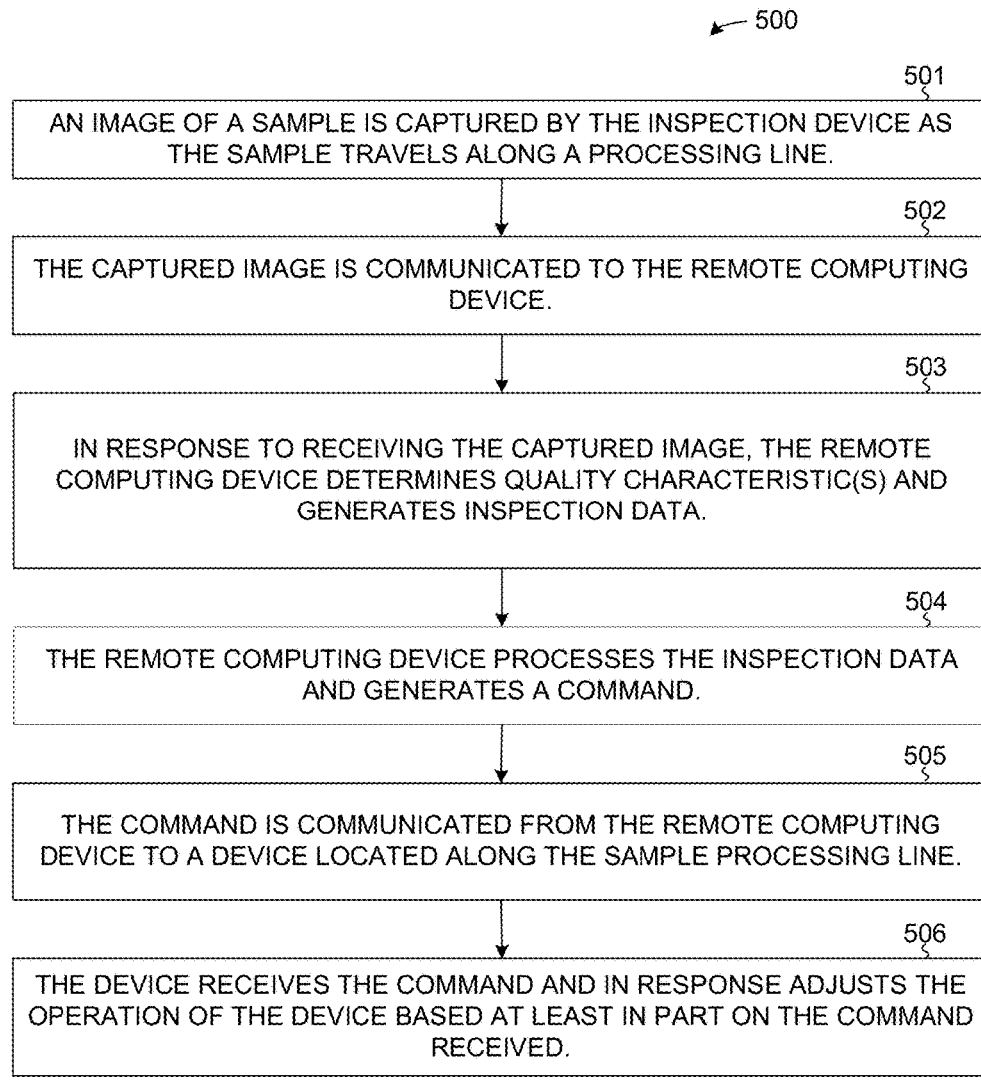
FIG. 26 is a flowchart illustrating a first example of the operation of an inspection data communication system using a remote computing device.

FIG. 26 is a flowchart 500 of an inspection data control system using a remote computing device. In step 501, an image of a sample is captured by the inspection device as the sample travels along a processing line. In step 502, the captured image is communicated to the remote computing device. In step 503, in response to receiving the captured image, the remote computing device determines quality characteristic(s) and generates inspection data. In step 504, the remote computing device processes the inspection data and generates a command. In step 505, the command is communicated from the remote computing device to a device located along the sample processing line. In step 506, the device receives the command and in response adjusts the operation of the device based at least in part on the command received.

Figure 27:
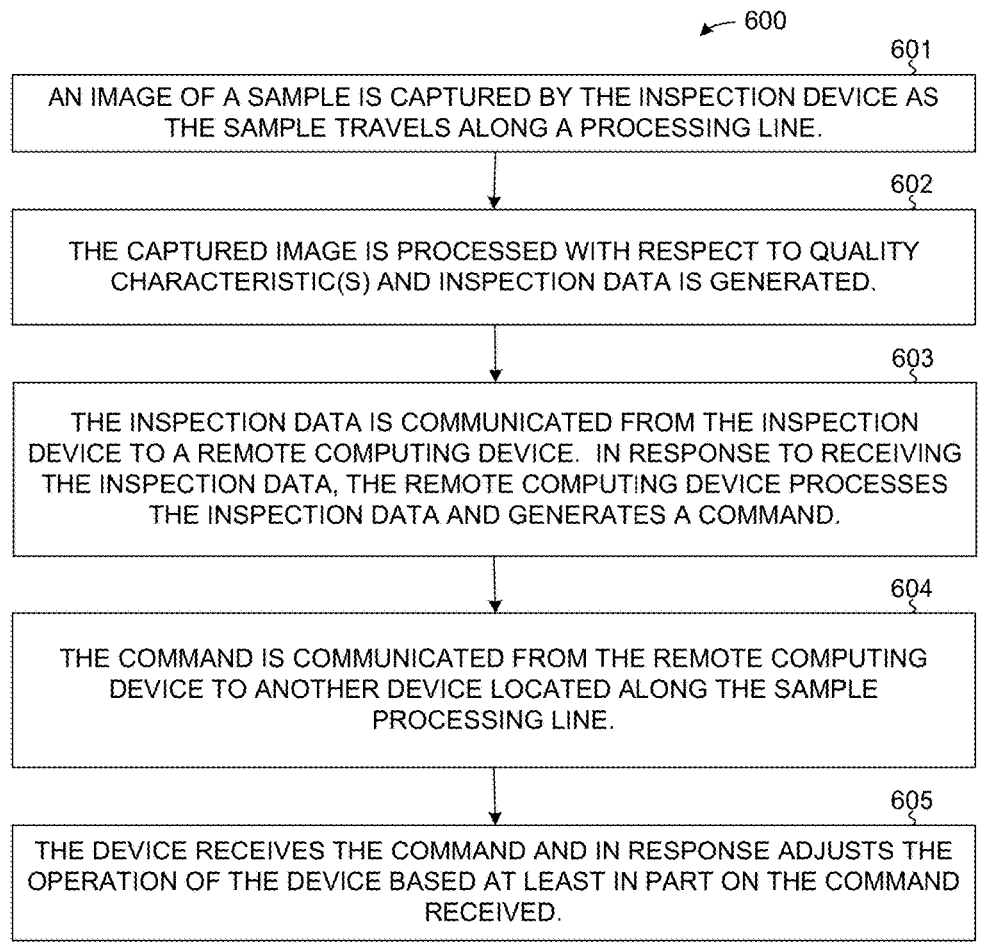
FIG. 27 is a flowchart illustrating a second example of the operation of an inspection data communication system.

FIG. 27 is a flowchart 600 of an inspection data control system using a remote computing device. In step 601, an image of a sample is captured by the inspection device as the sample travels along the processing line. In step 602, the captured image is processed with respect to quality characteristic(s) and inspection data is generated. In step 603, the inspection data is communicated from the inspection device to a remote computing device and in response to receiving the inspection data, the remote computing device processes the inspection data and generates a command. In step 604, the command is communicated from the remote computing device to another device located along the sample processing line. In step 605, the device receives the command and in response adjusts the operation of the device based at least in part on the command received.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. An optical inspector with feedback capability, comprising:
    an optical device that captures an image, wherein the image is captured when a sample is within the field of view of the optical device;
    a storage device that stores the captured image;
    a processor that determines a quality characteristic value of the sample based on the captured image; and
    an interface circuit that outputs inspection data or a command, wherein the inspection data or command is generated based on the quality characteristic value, wherein the inspection data or command is received by a slave device, wherein the optical inspector and the slave device are both located within a sample processing line, and wherein the slave device is selected from the group consisting of: a sorting device, a mixing device, a display device, a sizing device, a blanching device, a feeding device, a cutting, a slicing device, a baking device, a drying device, a freezing device, a coating device, and a washing device.

2. The optical inspector of claim 1, wherein the inspection data is received by a remote computing device, and wherein the remote computing device generates a command based on the inspection data and outputs the command to a slave device.

3. The optical inspector of Claim 1, wherein the slave device determines a new threshold or a new set point value based at least in part on the inspection data.

4. The optical inspector of claim 1, wherein the inspection data represents the quality characteristic value.

5. The optical inspector of claim 1, wherein the optical inspector captures multiple images of multiple samples, wherein the processor generates a plurality of quality characteristic values, wherein inspection data is based on the plurality of characteristic values, and wherein the inspection data includes a percentage of the different samples that satisfy, or do not satisfy, a predetermined requirement.

6. The optical inspector of claim 1, wherein the inspection data is based on a plurality of characteristic values, and wherein the inspection data includes an absolute number of the different samples that satisfy, or do not satisfy, a predetermined requirement.

7. The optical inspector of claim 6, wherein the predetermined requirement is that the sample is, or is not, a specific type of object.

8. The optical inspector of claim 6, wherein the predetermined requirement is that a defect is, or is not, present on the sample.

9. The optical inspector of claim 1, wherein the interface circuit outputs a command, and wherein the command is a command to change a threshold value or a set point value.

10. The optical inspector of claim 1, wherein the interface circuit outputs a command, and wherein the command is a command to change a set point value.

11. The optical inspector of claim 1, wherein the captured image of the sample is captured while the sample is in-flight.

12. The optical inspector of claim 1, wherein the captured image is a three dimensional (3D) image.

13. The optical inspector of claim 1, wherein the interface is a wired interface or a wireless interface.

14. The optical inspector of claim 1, wherein the interface is a OLE (Object Linking and Embedding) for Process Control (OPC) bus.

15. An optical inspector with feedback capability, comprising:
   an optical device that captures an image, wherein the image is captured when a sample is within the field of view of the optical device;
   a storage device that stores the captured image;
   a processor that determines a quality characteristic value of the sample based on the captured image; and
   an interface circuit that outputs inspection data or a command, wherein the inspection data or command is generated based on the quality characteristic value, wherein the interface circuit outputs the command, and wherein the command is a command to change a mixing ratio of different sample sources.

16. A method of controlling a processing line, comprising:
   (a) capturing an image of a sample traversing the processing line;
   (b) determining a quality characteristic of the sample based at least in part on the captured image; and
   (c) causing the operation of a device located in the processing line to be adjusted based at least in part on the quality characteristic value, wherein the capturing of (a) is performed by a optical device, wherein the determining of (b) is based at least in part on a plurality of captured images of multiple samples, and wherein the causing of (c) is performed in part by a network interface circuit.

17. An optical inspector, comprising:
   an optical device that captures an image of a sample; a memory that stores the image of the sample; a first means for determining a quality characteristic of the sample based at least in part on the image; and a second means for outputting the quality characteristic or a command based on the quality characteristic, wherein the quality characteristic or command is received by a slave device, wherein the optical device and the slave device are both located within a sample processing line, and wherein the slave device is selected from the group consisting of: a sorting device, a mixing device, a display device, a sizing device, a blanching device, a feeding device, a cutting, a slicing device, a baking device, a drying device, a freezing device, a coating device, and a washing device.

* * * * *